US009253014B2

(12) United States Patent
Miki et al.

(10) Patent No.: US 9,253,014 B2
(45) Date of Patent: Feb. 2, 2016

(54) COMPUTER SYSTEM AND APPLICATION PROGRAM EXECUTION ENVIRONMENT MIGRATION METHOD

(75) Inventors: Kenichi Miki, Odawara (JP); Taro Ishizaki, Odawara (JP); Shinichiro Yoshioka, Odawara (JP); Kenzo Tabata, Odawara (JP)

(73) Assignee: HITACHI, LTD., Tokyo (JP)

( * ) Notice: Subject to any disclaimer, the term of this patent is extended or adjusted under 35 U.S.C. 154(b) by 698 days.

(21) Appl. No.: 13/580,633

(22) PCT Filed: Jun. 25, 2012

(86) PCT No.: PCT/JP2012/066160
§ 371 (c)(1),
(2), (4) Date: Aug. 22, 2012

(87) PCT Pub. No.: WO2014/002165
PCT Pub. Date: Jan. 3, 2014

(65) Prior Publication Data
US 2013/0346616 A1 Dec. 26, 2013

(51) Int. Cl.
*H04L 29/08* (2006.01)
*G06F 9/48* (2006.01)
(52) U.S. Cl.
CPC ........ *H04L 29/08144* (2013.01); *G06F 9/4856* (2013.01)
(58) Field of Classification Search
CPC .............................................. H04L 29/08144
USPC .......................................................... 709/226
See application file for complete search history.

(56) References Cited

U.S. PATENT DOCUMENTS

| 6,731,314 | B1 * | 5/2004 | Cheng | G06F 17/30873 707/E17.111 |
| 6,910,213 | B1 * | 6/2005 | Hirono | G06F 9/4843 711/E12.011 |
| 7,814,182 | B2 * | 10/2010 | Cadigan et al. | 709/220 |
| 8,046,764 | B2 * | 10/2011 | Yamakabe | G06F 9/5072 709/226 |

(Continued)

FOREIGN PATENT DOCUMENTS

| EP | 1909165 A2 * | 4/2008 |
| JP | 2007-109262 A | 4/2007 |

(Continued)

OTHER PUBLICATIONS

Merriam-Webster, "prescribe", 2015.*

*Primary Examiner* — O. C. Vostal
(74) *Attorney, Agent, or Firm* — Volpe and Keonig, P.C.

(57) ABSTRACT

The present invention makes it possible for a virtual higher-level device disposed on a virtual platform to use prescribed data related to an application. A virtual higher-level device 20 is disposed on a virtual platform 30. A storage system 40 comprises logical volumes 41, 42 for storing prescribed data related to an application program 11. A management computer 50 prepares prescribed logical volumes 43, 44 in the storage system 40 so that the virtual higher-level device 20 is able to use the prescribed data related to the application program, couples a communication interface part of the virtual platform 30 to a communication port part of the storage system 40 so as to make it possible to access the prepared prescribed logical volumes 43, 44 via the virtual platform 30, and further transparently allocates the prescribed logical volumes 43, 44 to the virtual higher-level device 20.

13 Claims, 29 Drawing Sheets

(56) References Cited

U.S. PATENT DOCUMENTS

| | | | |
|---|---|---|---|
| 8,832,397 B2* | 9/2014 | Iwamura | G06F 11/2076 709/217 |
| 2002/0091709 A1* | 7/2002 | Jung | 707/104.1 |
| 2002/0144077 A1* | 10/2002 | Andersson | G06F 12/145 711/203 |
| 2006/0047909 A1 | 3/2006 | Takahashi et al. | |
| 2007/0226447 A1* | 9/2007 | Shimozono et al. | 711/170 |
| 2008/0028143 A1* | 1/2008 | Murase | 711/114 |
| 2008/0114931 A1* | 5/2008 | Aoki | 711/114 |
| 2009/0025007 A1 | 1/2009 | Hara et al. | |
| 2009/0113124 A1 | 4/2009 | Kataoka et al. | |
| 2009/0282101 A1* | 11/2009 | Lim et al. | 709/203 |
| 2010/0077158 A1* | 3/2010 | Asano et al. | 711/154 |
| 2010/0274766 A1* | 10/2010 | Nagashima et al. | 707/654 |
| 2011/0107347 A1* | 5/2011 | Raisch et al. | 719/313 |
| 2011/0191521 A1* | 8/2011 | Araki et al. | 711/103 |
| 2011/0246669 A1 | 10/2011 | Kanada et al. | |
| 2011/0289204 A1* | 11/2011 | Hansson et al. | 709/224 |
| 2012/0011339 A1* | 1/2012 | Mori et al. | 711/171 |
| 2012/0131287 A1* | 5/2012 | Nishina et al. | 711/154 |
| 2012/0254439 A1* | 10/2012 | Yamasaki | G06F 9/505 709/226 |
| 2012/0290865 A1* | 11/2012 | Kansal | G06F 1/3203 713/340 |
| 2013/0073821 A1* | 3/2013 | Flynn et al. | 711/162 |
| 2013/0304923 A1* | 11/2013 | Clay | G06F 9/5027 709/226 |
| 2014/0215076 A1* | 7/2014 | Grothues | G06F 9/455 709/226 |

FOREIGN PATENT DOCUMENTS

| | | |
|---|---|---|
| JP | 2009-026295 A | 2/2009 |
| JP | 2009-104530 A | 5/2009 |
| JP | 2011-210032 A | 10/2011 |

* cited by examiner

Fig. 14

| Copy-source disk information T10 | | | |
|---|---|---|---|
| Mount point (C100) | Volume group information (C101) | Storage serial # (C102) | Storage LU information (C103) |
| C:¥ | — | 100001 | 001 |
| C:¥usr¥mnt1 | — | 100001 | 002 |
| C:¥usr¥mnt2 | — | 100001 | 003 |
| O:¥ | VG01 | 100001 | 004 |
| | | 100001 | 005 |

Fig. 15

| Copy-destination disk information (user input) T11 | | | | |
|---|---|---|---|---|
| C110 | C111 | C112 | C113 | C114 |
| Copy-destination mount point | Copy-destination volume group information | Storage serial # | New copy-destination LU resource | Copy-destination storage LU information |
| C:¥ | — | 100001 | Pool 1 | 101 |
| C:¥usr¥mnt1 | — | 100001 | Pool 1 | 102 |
| C:¥usr¥mnt2 | — | 100001 | Pool 2 | 103 |
| O:¥ | VG01 | 100001 | Pool 3 | 104 |
| | | 100001 | Pool 3 | 105 |

Fig. 17

| Copy-source disk information T12 | | | |
|---|---|---|---|
| C120 Mount point | C121 Volume group information | C122 Storage serial # | C123 Storage LU information |
| C:¥ | — | 100001 | 001 |
| C:¥usr¥mnt1 | — | 100001 | 002 |
| C:¥usr¥mnt2 | — | 100001 | 003 |
| O:¥ | VG01 | 100001 | 004 |
| | | 100001 | 005 |

Fig. 18

| Migration-destination disk information (user input) T13 ||||
| C130 | C131 | C132 | C133 |
| Migration-destination mount point | Migration-destination volume group information | Storage serial # | Storage LU information |
| C:¥ | — | 100001 | 001 |
| C:¥usr¥mnt1 | — | 100001 | 002 |
| C:¥usr¥mnt2 | — | 100001 | 003 |
| O:¥ | VG01 | 100001 | 004 |
|  |  | 100001 | 005 |

COMPUTER SYSTEM AND APPLICATION PROGRAM EXECUTION ENVIRONMENT MIGRATION METHOD

TECHNICAL FIELD

The present invention relates to a computer system and a method for migrating an application program execution environment.

BACKGROUND ART

In order to use computers effectively, technology for disposing multiple virtualized computers (virtual computers) on a physical computer is known (Patent Literature 1). In the prior art, a virtual computer on one physical computer can be migrated to another physical computer.

CITATION LIST

Patent Literature

[PTL 1]
Japanese Patent Application Laid-open No. 2011-210032

Technical Problem

A virtual platform for providing a virtual computer is disposed between the virtual computer and the storage control apparatus, which comprises a logical volume used by the virtual computer. Software for controlling the virtual computer is in charge of changing the configuration of the virtual platform. Therefore, the virtual computer is not able to control the physical configuration of the virtual platform.

Thus, in the prior art, it is impossible to automatically allocate a logical volume to an application program being executed by a virtual computer on the virtual platform, and an application program execution environment cannot be easily migrated to another virtual computer.

Furthermore, in a case where a communication path is to be configured beforehand between either a migration-destination or a copy-destination computer and the storage control apparatus, or a virtual machine is to be booted up, cluster management software can be used to migrate the application program execution environment. However, this involves a lot of work beforehand and lowers user usability.

SUMMARY OF INVENTION

With the foregoing in view, an object of the present invention is to provide a computer system and a migration method for an application program execution environment, which make it possible to relatively easily migrate prescribed data related to an application program from a first computer to a second computer configured as a virtual computer, and to enhance usability.

Solution to Problem

A computer system related to one aspect of the present invention is for migrating an application program execution environment from a first computer to a second computer, wherein the second computer is configured as a virtual computer disposed on a virtual platform for providing a virtual computer, and the computer system comprises a storage control apparatus for storing prescribed data related to the application program, and a management computer, which is communicably coupled to the storage control apparatus, the first computer and the second computer, and manages the storage control apparatus, the first computer and the second computer. The management computer executes a volume preparation process for preparing, in the storage control apparatus, a prescribed logical volume for storing the prescribed data related to the application program so as to make it possible for the second computer to use the prescribed data, a coupling process for communicably coupling a communication interface part of the virtual platform and a communication port part, which is in the storage control apparatus and corresponds to the prescribed logical volume, so as to make it possible to access the prescribed logical volume prepared in the storage control apparatus via the virtual platform, and an allocation process for transparently allocating the prescribed logical volume to the second computer.

In the volume preparation process, in a case where the application program execution environment of the first computer is to be copied to the second computer, the prescribed logical volume may be prepared in the storage control apparatus by creating, in the storage control apparatus, a copy volume of the logical volume for storing the prescribed data related to the application program, and in a case where the execution environment of the application program of the first computer is to be migrated from the first computer to the second computer, may prepare the prescribed logical volume in the storage control apparatus by unmounting the logical volume for storing the prescribed data related to the application program from the first computer.

In the coupling process, the second computer can acquire communication interface identification information for identifying the communication interface part from the virtual platform in accordance with an instruction from the management computer, and send the acquired communication interface identification information to the management computer, and the management computer can instruct the storage control apparatus to allocate the communication interface identification information received from the second computer, to the communication port part corresponding to the prescribed logical volume.

The present invention can also be described as either a method or a computer program for migrating an application program execution environment.

BRIEF DESCRIPTION OF DRAWINGS

FIG. 14 is a block diagram of copy-source disk information for managing the information of a copy-source disk.

FIG. 15 is a block diagram of copy-destination disk information for managing the information of a copy-destination disk.

FIG. 17 is a block diagram of migration-source disk information for managing the information of a migration-source disk.

FIG. 18 is a block diagram of migration-destination disk information for managing the information of a migration-destination disk.

DESCRIPTION OF EMBODIMENTS

The embodiment of the present invention will be explained below by referring to the attached drawings. However, it should be noted that the embodiment is merely one example for realizing the present invention, and does not limit the technical scope of the present invention. Multiple characteristic features disclosed in the embodiment can be combined in a variety of ways.

A computer system related to the embodiment, as will be described in detail hereinbelow, prepares inside a storage control apparatus a prescribed logical volume for storing prescribed data related to an application program so as to make it possible for a second computer to use the prescribed data. In addition, the computer system communicably couples a communication interface part of the virtual platform with a communication port part, which is in the storage control apparatus and corresponds to the prescribed logical volume, so as to make it possible to access the prescribed logical volume prepared inside the storage control apparatus via a virtual platform. The computer system also transparently allocates the prescribed logical volume to the second computer.

EXAMPLE 1

A first example will be explained by referring to FIGS. 1 through 24. In the first example, the copying of an application execution environment from a physical higher-level device to a virtual higher-level device, the migration of the application execution environment from the physical higher-level device to the virtual higher-level device, and the migration of the application execution environment from a virtual higher-level device to another virtual higher-level device will be explained. In the first example, a higher-level device, which is either a copy source or a migration source, and a higher-level device, which is either a copy destination or a migration destination, use a common storage system.

Figure 1:
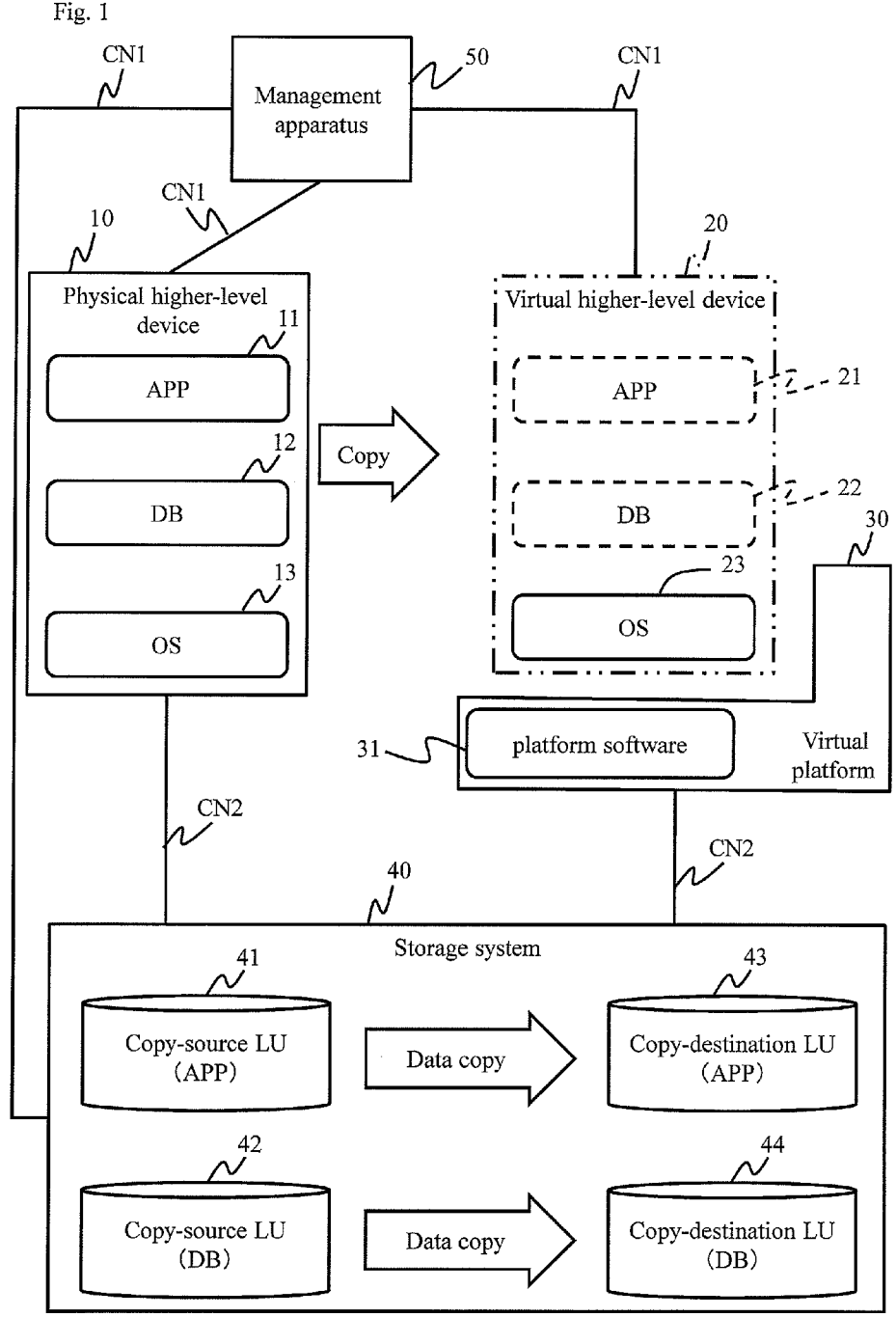
FIG. 1 is a schematic diagram related to an embodiment of the present invention showing how an application program execution environment is copied from a physical higher-level device to a virtual higher-level device.

FIG. 1 is an example of a computer system for copying an application execution environment from a physical higher-level device to a virtual higher-level device. The computer system, for example, comprises a physical higher-level device 10, a virtual higher-level device 20 and a virtual platform 30, a storage system 40, and a management apparatus 50.

The physical higher-level device 10, which is an example of the "first computer", is configured as a physical computer. The hardware configuration of the physical higher-level device 10 will be explained further below using FIG. 5. For example, an application program (APP in the drawing) 11, a database 12, which is used by the application program 11, and an operating system 13 run on the physical higher-level device 10. As the application program 11, for example, various types of business programs can be cited, such as a customer management program, an accounting program, and a personnel evaluation program.

The virtual higher-level device 20, which is an example of the "second computer", is configured as a virtual computer. The virtual platform 30, which is configured as a physical computer, comprises virtual platform software 31, and the virtual higher-level device 20 is built on the virtual platform software. The virtual higher-level device 20 comprises an application program 21 and a database 22, which are copied from the physical higher-level device 10, and an operating system (guest OS) 23. The application program 21 is copied from the application program 11 of the physical higher-level device 10, and the database 22 is copied from the database 12 of the physical higher-level device 10.

The virtual platform 30, as mentioned above, is a physical environment in which the virtual higher-level device 20 is disposed, and comprises the virtual platform software 31 for managing the virtual higher-level device 20. FIG. 1 shows a single virtual platform 30, and shows a case in which one virtual higher-level device 20 is disposed on the one virtual platform 30. In actuality, multiple virtual platforms 30 can be disposed in a computer system, and multiple virtual higher-level devices 20 can be disposed on each of the virtual platforms 30.

The storage system 40, which serves as the "storage control apparatus", is coupled to the physical higher-level device 10 and the virtual platform 30 via a communication network CN2 for data I/O (Input/Output). The storage system 40 comprises a logical volume 41 for storing program data of the application programs 11 and 21, and a logical volume 42 for storing the data of the databases 12 and 22. In addition, a copy volume 43 of the logical volume 41, and a copy volume 44 of the logical volume 42 are created in the storage system 40.

The program data of the application program 11 and the data of the database 12 used by the application program 11 are examples of the "prescribed data". The logical volume 41 for storing the program data and the logical volume 42 for storing the data are examples of either the "prescribed logical volume" or the "copy-source volume".

The management apparatus 50, which is an example of the "management computer", is coupled to the physical higher-level device 10, the virtual higher-level device 20, and the storage system 40, respectively, via a management communication network CN1. The management apparatus 50 is a computer for controlling either a copy or a migration of the application execution environment from one computer (the physical higher-level device 10) to another virtual computer (the virtual higher-level device 20).

The management communication network CN1, for example, is configured as a LAN (Local Area Network). The management communication network CN1 and the data I/O communication network CN2 may be separate communication networks, or may be a common communication network.

As shown in FIG. 1, the computer system of this example can either copy or migrate an application program 11 and a database 12 running on the physical higher-level device 10 to the virtual higher-level device 20. The application program execution environment is an environment for executing the application program 11, and may be called the application execution environment.

A copy signifies that the application program execution environment being executed on a copy-source higher-level device 10 is also formed on a copy-destination higher-level device 20. Subsequent to a copy, the copy-source higher-level device 10 and the copy-destination higher-level device 20 are both able to execute the same application program.

Therefore, for example, when the data 12 being used in a production process and the production application program 11 are formed on a virtual higher-level device 20, which is known as a so-called cloud service, development, testing, and training can be carried out under the same environment as the production environment. Therefore, in this computer system, the efficiency of such work as program development, troubleshooting, and training can be enhanced. Also, the copying of the application program 11 and the database 12 being used for production processing to a higher-level device inside a remote data center makes it possible to enhance disaster recovery performance.

In a case where the application execution environment is copied from the physical higher-level device 10 to the virtual higher-level device 20, as described above, a copy volume 43 of the logical volume 41 storing the data of the application program is created. In addition, a copy volume 44 of the logical volume 42 storing the data of the database used by the application program is created. Then, these copy volumes 43 and 44 are coupled to the virtual platform 30, and transparently allocated to the virtual higher-level device 20 via the virtual platform 30.

Transparently allocated signifies the allocation of a logical volume so that the virtual higher-level device 20 is able to directly access the logical volumes 43 and 44 without being conscious of the virtual platform 30. A transparently allocated logical volume may be called a transparently allocated disk.

A pass-through disk of Hyper-V, which is a virtualization function provided by the Microsoft Corporation of the US, can be cited as one example of a transparently allocated disk. In the case of a pass-through disk, a physical disk is allocated to the virtual higher-level device 20 as-is in volume units. Therefore, the virtual higher-level device 20 can access the logical volume relatively quickly to read and write data. By contrast, a method in which the OS (host OS) of a virtual platform receives an I/O request and command issued from the virtual higher-level device 20, executes the processing instead of the virtual higher-level device 20, converts the execution result and provides this result to the virtual higher-level device is known. Since the virtual higher-level device 20 accesses a physical disk via the host OS of the virtual platform 30, there is a large amount of overhead with this method.

In a case where the logical volume is coupled to the virtual platform, a WWN (World Wide Name), which is allocated to a HBA (Host Bus Adapter) of the virtual platform, is associated with the LUN (Logical Unit Number) of the logical volume. That is, the virtual platform WWN is listed in an access control list, which defines the host(s) that is/are allowed to access this LUN. This makes it possible to access the logical volume via the virtual platform HBA. Exercising control such that only an HBA having a specific WWN like this is able to access the logical volume is called LUN masking technology. A MAC (Media Access Control) address or other such physical address may be used instead of the WWN.

Figure 2:
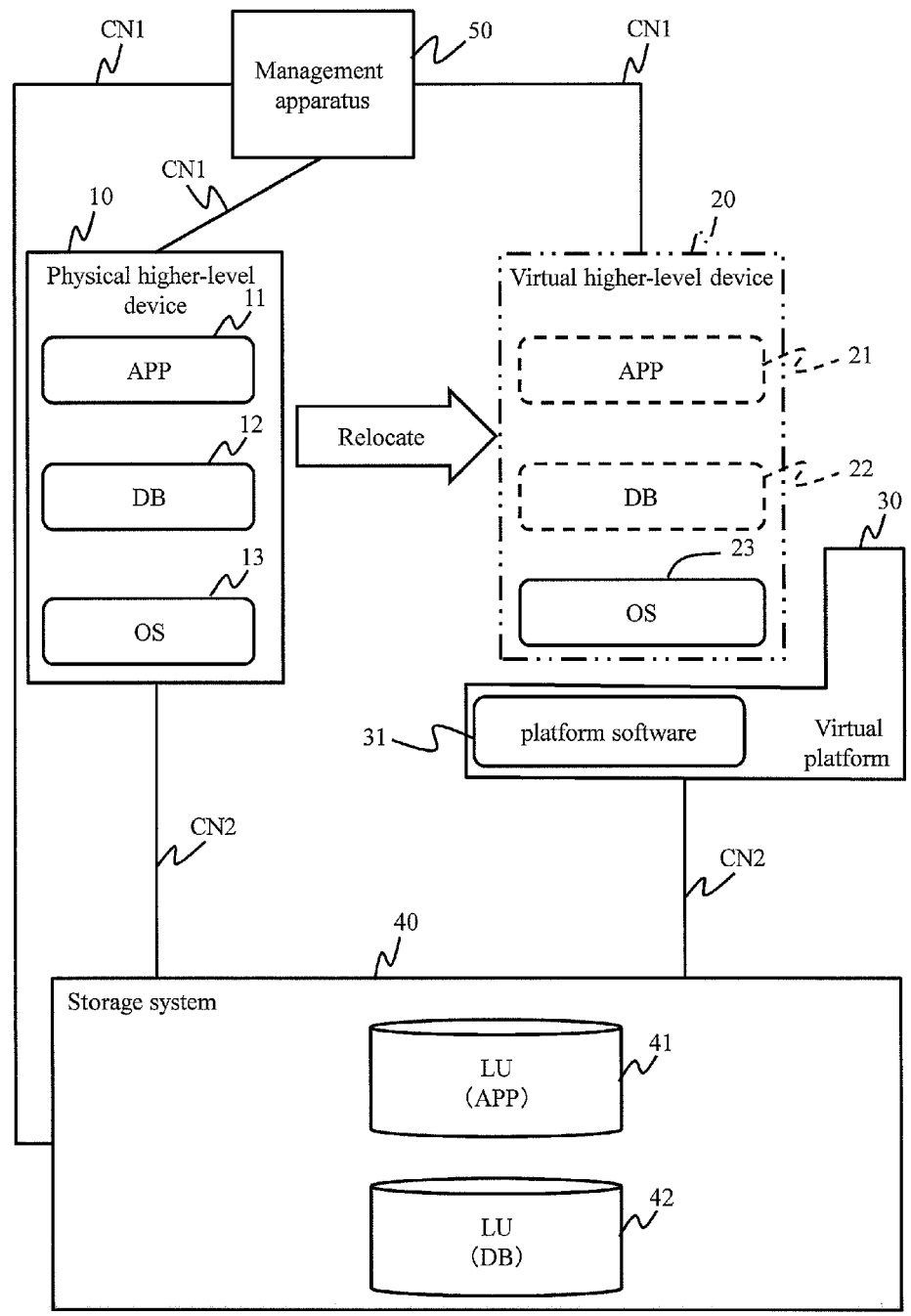
FIG. 2 is a schematic diagram showing how an application program execution environment is migrated from a physical higher-level device to a virtual higher-level device.

FIG. 2 shows how to migrate the application execution environment from the physical higher-level device 10 to the virtual higher-level device 20. As used here, the migration of the application execution environment signifies that an application execution environment running on a migration-source higher-level device is completely transferred to a migration-destination higher-level device, and the application execution environment is not left in the migration-source higher-level device.

In the physical higher-level device 10, which becomes the migration source, the logical volume 41 storing the application program 11 data and the logical volume 42 storing the database 12 data are unmounted. Then, these logical volumes 41 and 42 are coupled to the virtual platform 30 and transparently allocated to the virtual higher-level device 20 via the virtual platform 30.

The load on the migration-source higher-level device 10 can be reduced by migrating either all or part of either one or multiple application programs 11 running on the migration-source higher-level device 10 to the migration-destination higher-level device 20.

Figure 3:
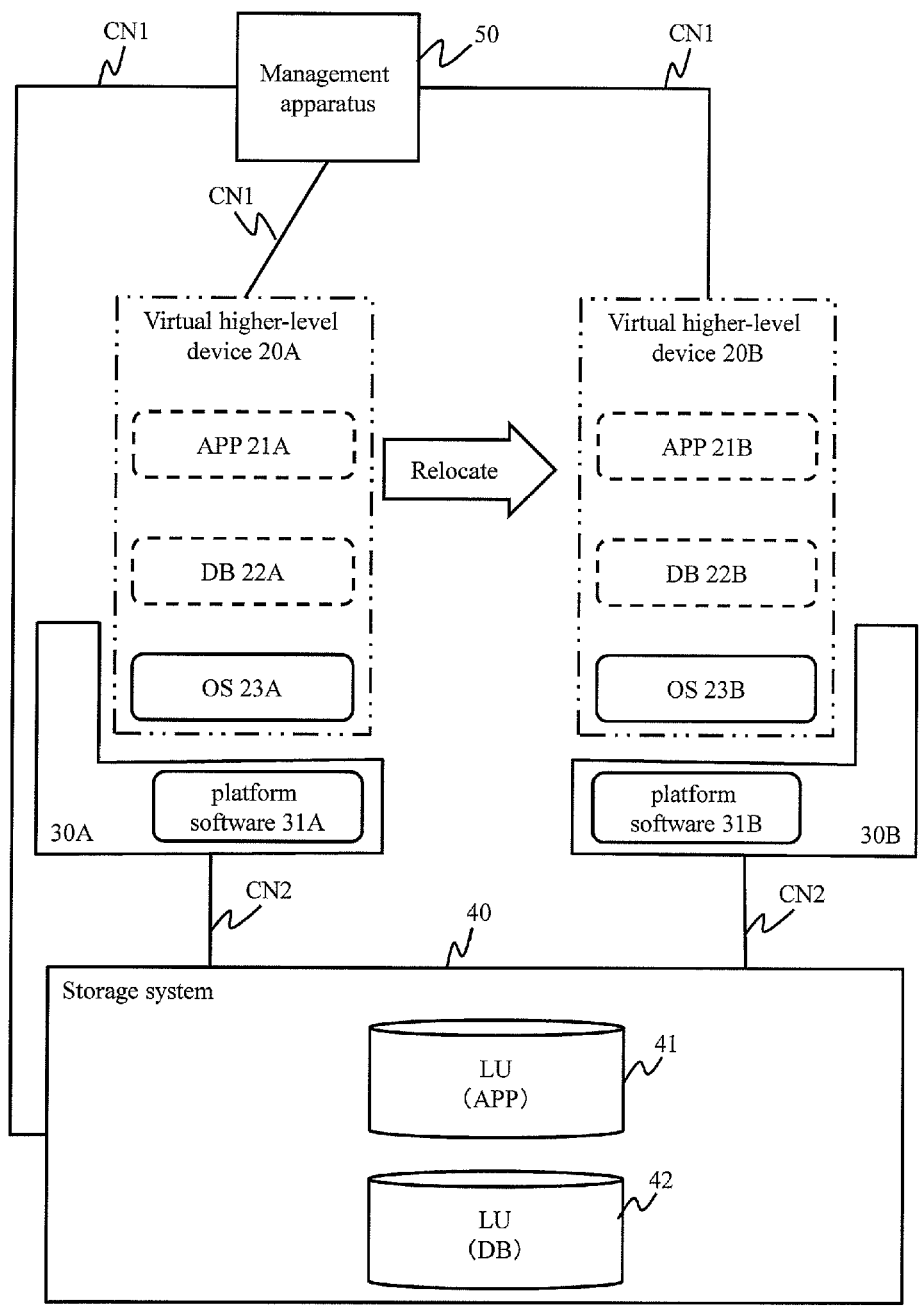
FIG. 3 is a schematic diagram showing how an application program execution environment is migrated from a virtual higher-level device to another virtual higher-level device.
Figure 4:
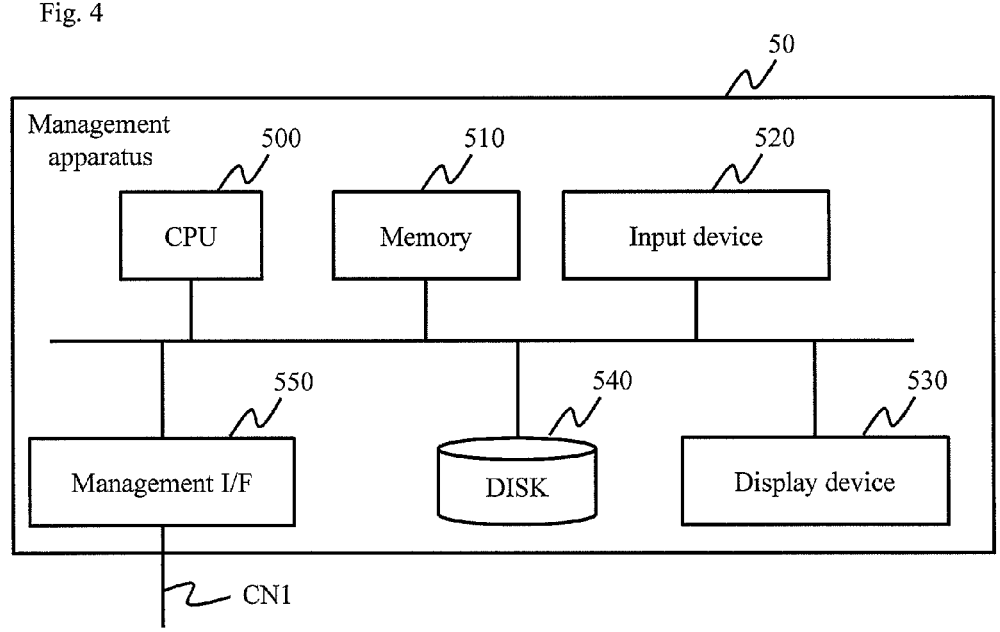
FIG. 4 is a hardware block diagram of a management apparatus.

FIG. 3 shows how to migrate an application execution environment from a virtual higher-level device 20A, which corresponds to the "first computer", to another virtual higher-level device 20B, which corresponds to the "second computer". The migration-source higher-level device 20A and the migration-destination higher-level device 20B are both configured as virtual computers (virtual machines).

The migration-source virtual higher-level device 20A is disposed on a virtual platform 30A, and is managed by virtual platform software 31A. The migration-source virtual higher-level device 20A comprises an application program 21A, a database 22A, and an operating system 23A. Similarly, the migration-destination virtual higher-level device 20B is disposed on a virtual platform 30B, and is managed by virtual platform software 31B. The migration-destination virtual higher-level device 20B comprises an application program 21B, a database 22B, and an operating system 23B.

An example of the hardware configuration of each of the devices/apparatuses 10, 20, 30, 40, and 50 will be explained by using FIGS. 4 through 8. First, the hardware configuration of the management apparatus 50 will be explained using FIG. 4. The management apparatus 50, for example, comprises a microprocessor 500, a memory 510, an input device 520, a display device 530, a disk 540, and a management interface 550.

Figure 9:
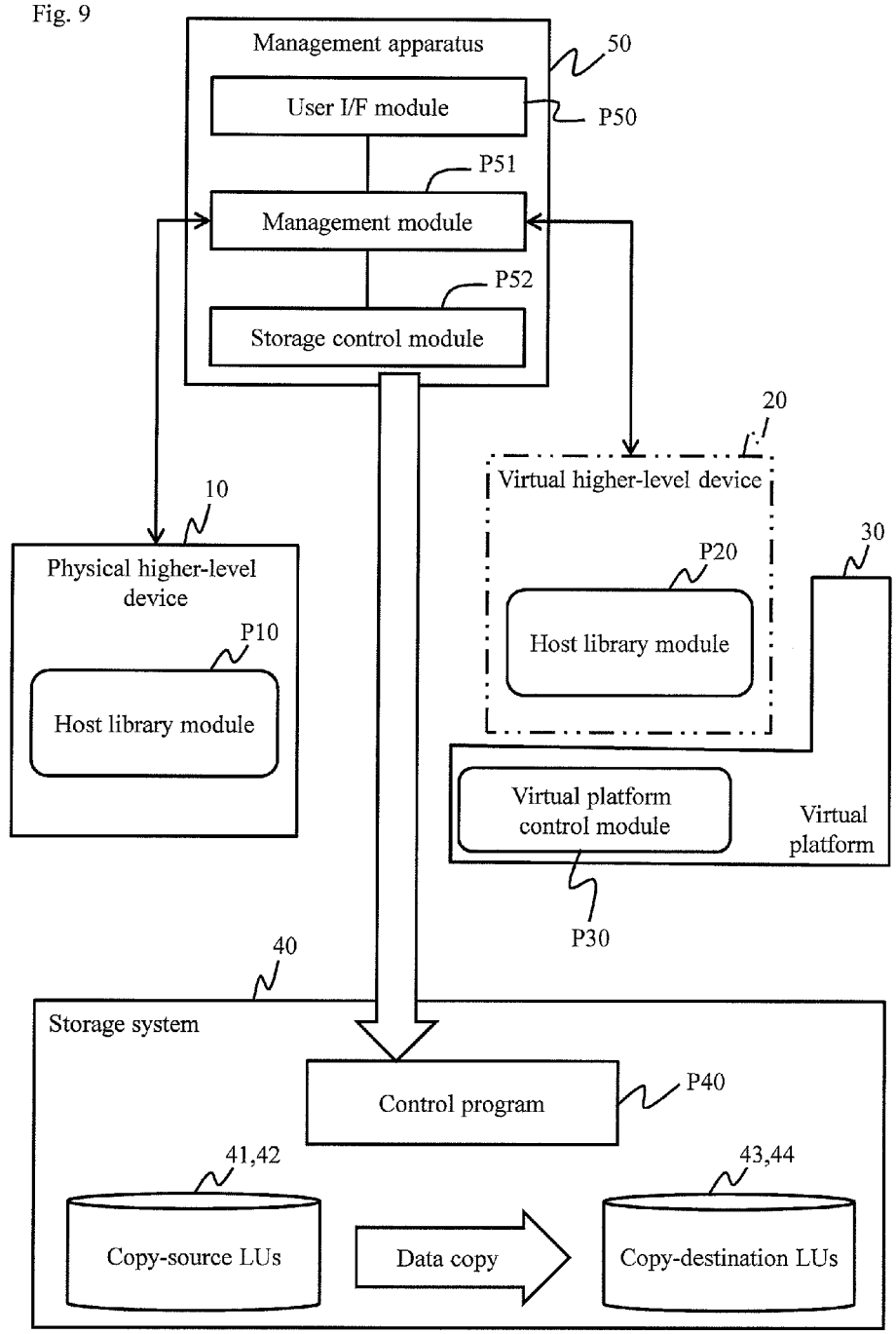
FIG. 9 is a software block diagram of a computer system.

The memory 510 stores various types of programs for realizing the functions of the management apparatus 50, such as a user interface module P50, a management module P51, and a storage control module P52, which will be explained further below using FIG. 9, and a device driver and an operating system. The microprocessor 500 realizes each function, which will be described further below, by arbitrarily reading and executing each type of program stored in the memory 510.

The input device 520 is for receiving an instruction or the like from the user. As the input device 520, for example, it is possible to cite a keyboard, a mouse, a touch panel, a voice-input device, an attitude sensor, and a brain-wave detection device. The display device 530 is for providing information to the user from the management apparatus 50. As the display device 530, for example, it is possible to cite a display, a printer, and a voice-output device.

The disk 540, which serves as an auxiliary storage device, for example, is configured from a relatively large capacity, rewritable storage device, such as a hard disk drive or a flash memory device. The management interface 550 is a communication circuit and communication software for communicating with each higher-level device and the storage system 40 via the management communication network CN1.

Figure 5:
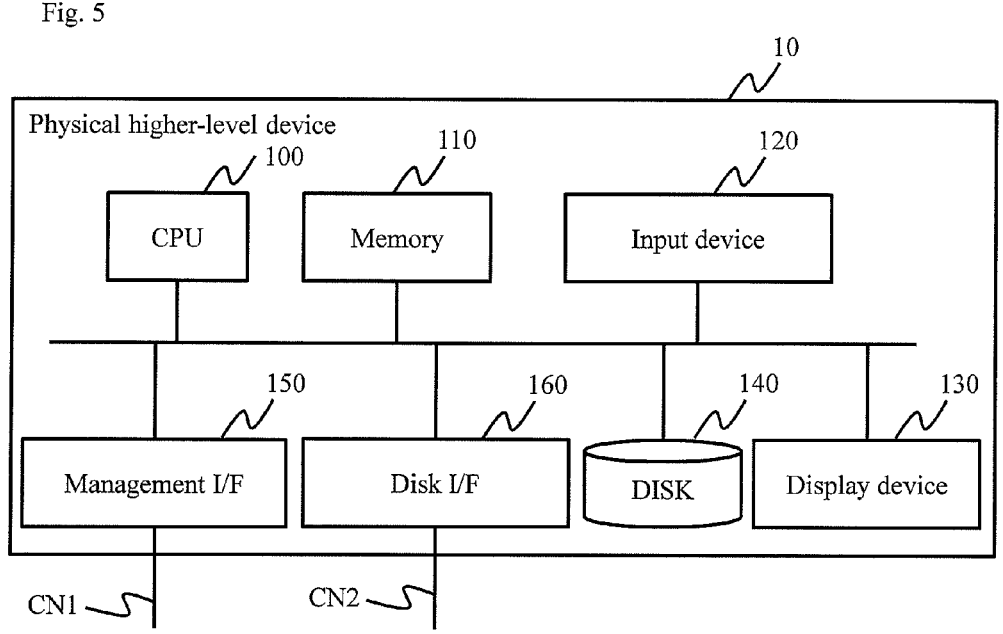
FIG. 5 is a hardware block diagram of a physical higher-level device.

The hardware configuration of the physical higher-level device 10 will be explained using FIG. 5. The physical higher-level device 10, for example, comprises a microprocessor 100, a memory 110, an input device 120, a display device 130, a disk 140, a management interface 150, and a disk interface 160.

The memory 110 stores an operating system. The microprocessor 100 reads an application program 11 from an accessible logical volume via the disk interface 160, and executes this program 11 on the OS. The input device 120, the display device 130, the disk 140, and the management interface 150 are the same as the configurations of 520, 530, 540, and 550 described in accordance with the management apparatus 50, and as such, duplicate explanations will be omitted.

The disk interface 160 is a communication circuit and communication software for accessing a logical volume inside the storage system 40 via the data I/O communication network CN2. As the disk interface 160, for example, it is possible to cite a FC (Fibre Channel) interface, and an iSCSI (Internet Small Computer System Interface) interface.

The hardware configuration of the virtual higher-level device 20 (virtual hardware) will be explained by referring to FIG. 6. The physical configuration of the virtual platform 30 (FIG. 7) is virtually allocated to each virtual higher-level device 20 disposed on the virtual platform 30.

The virtual higher-level device 20, for example, virtually comprises a microprocessor 200, a memory 210, an input device 220, a display device 230, a disk 240, a management interface 250, and a disk interface 260. The memory 210 stores a guest OS and a host library module P20, which will be explained further below. The microprocessor 200 reads and executes an application program 21 from an accessible logical volume via the disk interface 260.

The input device 220, the display device 230, the disk 240, the management interface 250, and the disk interface 260 are the same as those described in accordance with the physical higher-level device 10, and as such, duplicate explanations will be omitted. However, in this example, the logical volume inside the storage system 40 is transparently allocated to the virtual higher-level device 20 via the virtual platform 30.

Figure 7:
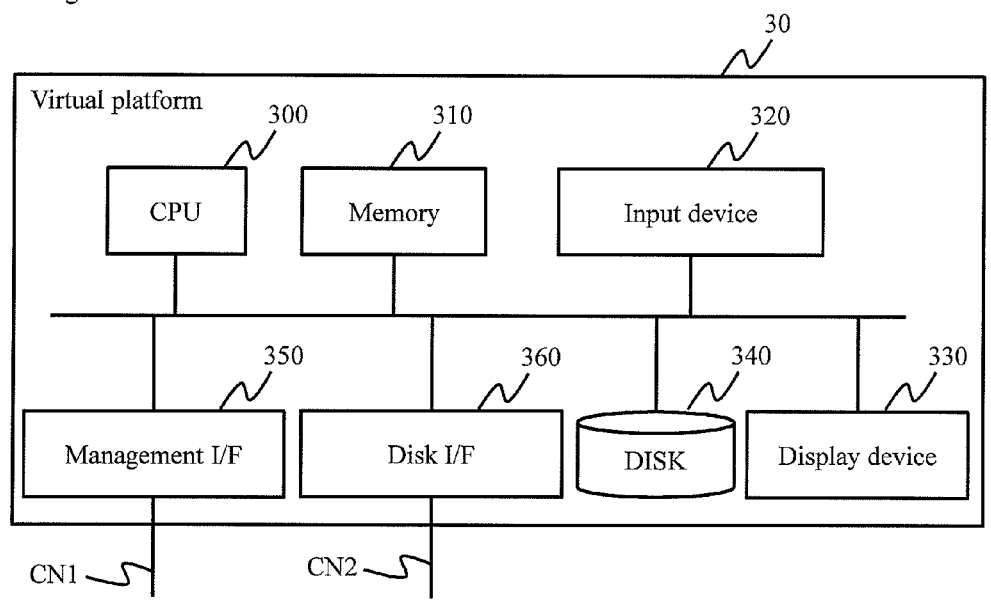
FIG. 7 is a hardware block diagram of a virtual platform.

The hardware configuration of the virtual platform 30 will be explained using FIG. 7. The virtual platform 30 is a physical computer for running the virtual platform software 31 for managing the virtual higher-level device 20, and comprises a microprocessor 300, a memory 310, an input device 320, a display device 330, a disk 340, a management interface 350, and a disk interface 360.

The memory 310 stores the virtual platform software 31, and a virtual platform control module P30, which will be explained further below. The microprocessor 300 realizes the functions of the virtual platform by reading and executing a program from the memory 310.

Figure 6:
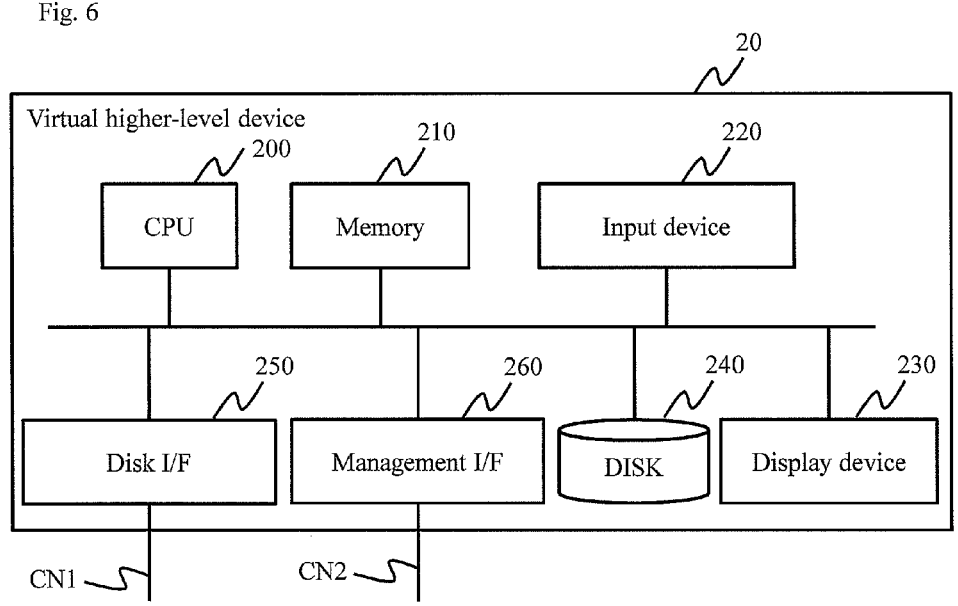
FIG. 6 is a hardware block diagram of a virtual higher-level device.

The input device 320, the display device 330, the disk 340, the management interface 350, and the disk interface 360 are the same as those in FIG. 6, and as such, explanations will be omitted. The WWN or other such physical address of the disk interface 360 is associated with the LUN of the logical volume inside the storage system 40.

The hardware configuration of the storage system 40 will be explained by referring to FIG. 8. The storage system 40 is broadly divided into a controller 400 for controlling the operation of the storage system 40, and a storage device 480 for storing data.

The controller 400, for example, comprises a host interface part 410, a disk control part 420, a microprocessor part 430, a cache memory 440, a shared memory 450, and a management interface part 460, and these parts 410 through 460 are coupled using a switching circuit 470.

The host interface part 410 is in charge of communications with the higher-level devices (the physical higher-level device and the virtual higher-level device). The host interface part 410 comprises multiple communication ports 411, and each communication port 411 can be coupled to a different higher-level device. The LUN of a logical volume 482 is associated with the communication port 411. Therefore, the higher-level device can access a desired logical volume 482 via the HBA, the data I/O communication network CN2, and the communication port 411.

The disk control part 420 controls data input/output to/from each storage device 480, and manages the status of each storage device 480. The microprocessor part 430 controls the operation of the controller 400 by reading and executing a control program P40 (FIG. 9). The microprocessor part 430 also communicates with the management apparatus 50 via the management interface 460.

The cache memory 440 temporarily stores data received from the higher-level device, and temporarily stores data read from the logical volume 482. The shared memory 450 stores management information and control information for managing the storage system 40. For example, the shared memory 450 stores information for managing the configuration of the logical volume 482, information for managing a communication port, and an access control list. A required portion of this information is also copied to the host interface part 410.

The management interface part 460 communicates with the management apparatus 50 via the management communication network CN1.

The storage system 40 comprises multiple storage devices 480. The storage devices 480 and the controller 400 may be disposed in the same enclosure, or may be disposed in different enclosures. Various storage devices capable of reading and writing data can be used as the storage device 480, such as, for example, a hard disk device, a semiconductor memory device, an optical disk device, and a magneto-optical disk device.

In a case where a hard disk device is used as the storage device, for example, a FC (Fibre Channel) disk, a SCSI (Small Computer System Interface) disk, a SATA disk, an ATA (AT Attachment) disk, and a SAS (Serial Attached SCSI) disk can be used. Also, for example, a variety of other storage devices can also be used, such as a flash memory, a FeRAM (Ferroelectric Random Access Memory), a MRAM (Magnetoresistive Random Access Memory), a phase-change memory (Ovonic Unified Memory), and a RRAM (registered trademark). In addition, the configuration may also be such that, for example, different types of storage devices are intermixed, such as a flash memory device and a hard disk device.

A RAID (Redundant Arrays of Inexpensive Disks) group 481 is formed as a physical storage apparatus by consolidating the physical storage area (s) of one or multiple storage devices 480 into a single area. A logical volume 482 of either a fixed size or an arbitrary size can be formed using the physical storage area of the RAID group 481. The logical volume (logical unit) 482 is coupled to a prescribed communication port 411 via the LUN thereof, and is allocated to the HBA via the communication port 411.

The hardware configurations shown in FIGS. 4 through 8 are examples, and the present invention is not limited to the configurations shown in the drawings. For example, the configuration may be such that the controller 400 and the storage devices 480 of the storage system 40 are stored in different enclosures, and the functions of the controller 400 are provided inside a switching device, such as either a router or a switching hub. The configuration may also be such that the management apparatus 50 is disposed inside the physical higher-level device 10.

An overview of the software configuration of the computer system will be explained using FIG. 9. The management apparatus 50, for example, comprises a user interface module P50, a management module P51, and a storage control module P52.

The user interface module P50 is a function for exchanging information with the user using the input device 520 and the display device 530. The management module P51 is a function for supervising the operations of the management apparatus 50. The storage control module P52 is a function for controlling the operations of the storage system 40 by issuing instructions to the storage system 40 controller 400.

The physical higher-level device 10 comprises a host library P10. The virtual higher-level device 20 also comprises a host library P20. The host libraries P10 and P20 are groups of program components for providing various types of functions as a higher-level device.

The virtual platform 30 comprises a virtual platform control module P30. The virtual platform control module P30, as will be explained further below, controls the physical configuration of the virtual platform 30 in accordance with an instruction from the host library P20. The virtual platform control module P30 attaches an indicated logical volume 482 to the HBA (disk interface 360) of the virtual platform 30, and detaches a logical volume 482, which has been attached to the HBA.

The storage system 40 comprises a storage control program P40 for controlling the storage system 40. The storage control program P40 can operate in accordance with an instruction from the storage control module P52 of the management apparatus 50. The storage control program P40, for example, creates a logical volume, deletes a logical volume, and copies data from one logical volume to another logical volume. In addition, the storage control program P40 associates a WWN with a logical volume LUN, and manages a pool or a volume group comprising multiple logical volumes.

Figure 8:
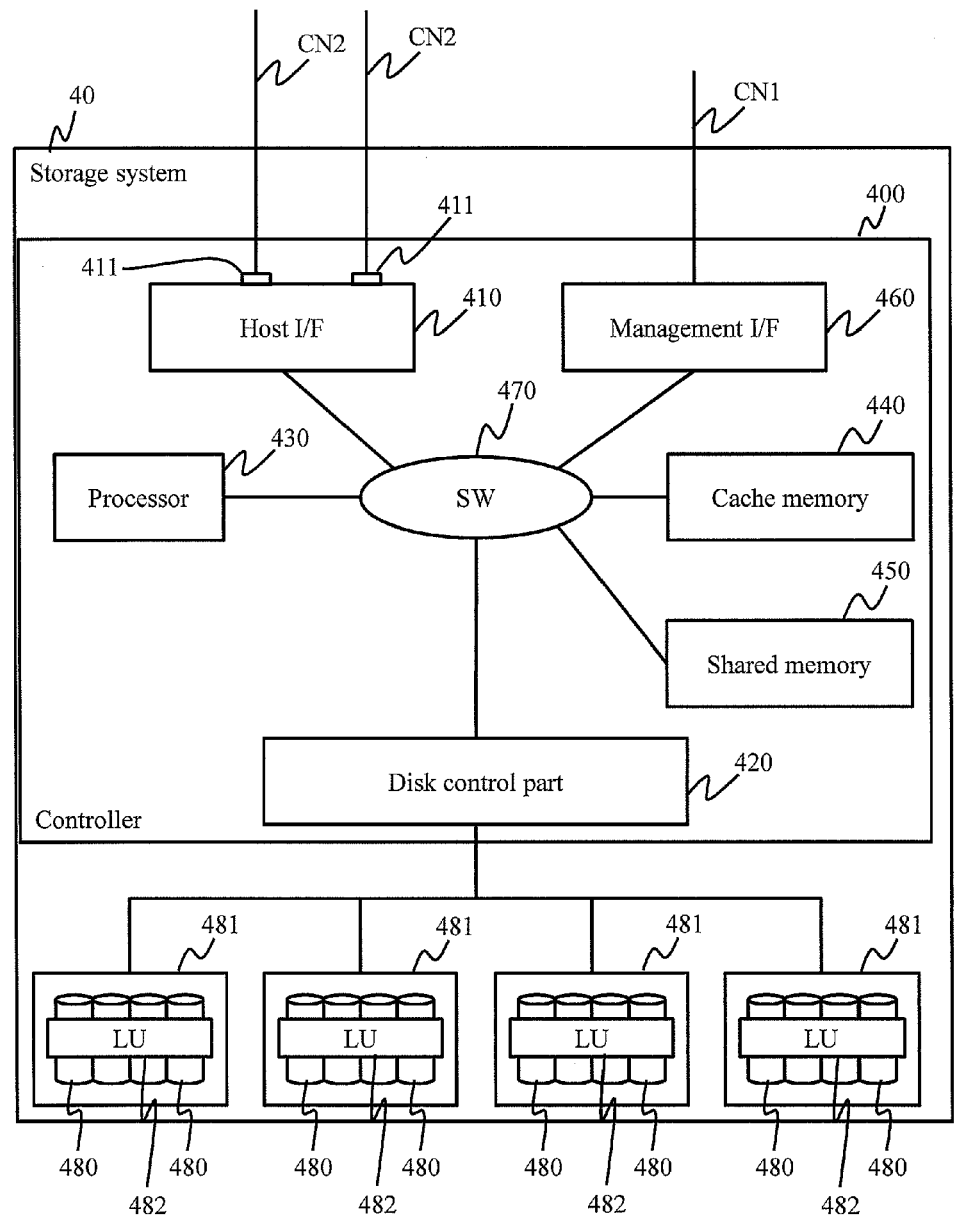
FIG. 8 is a hardware block diagram of a storage system.

In FIG. 8, the reference sign 482 is assigned to an ordinary logical volume, but hereinbelow, in order to make a clear distinction between a copy-source volume, a copy-destination volume, a migration-source volume and so forth, explanations may be given using the reference signs shown in FIGS. 1 through 3.

Figure 10:
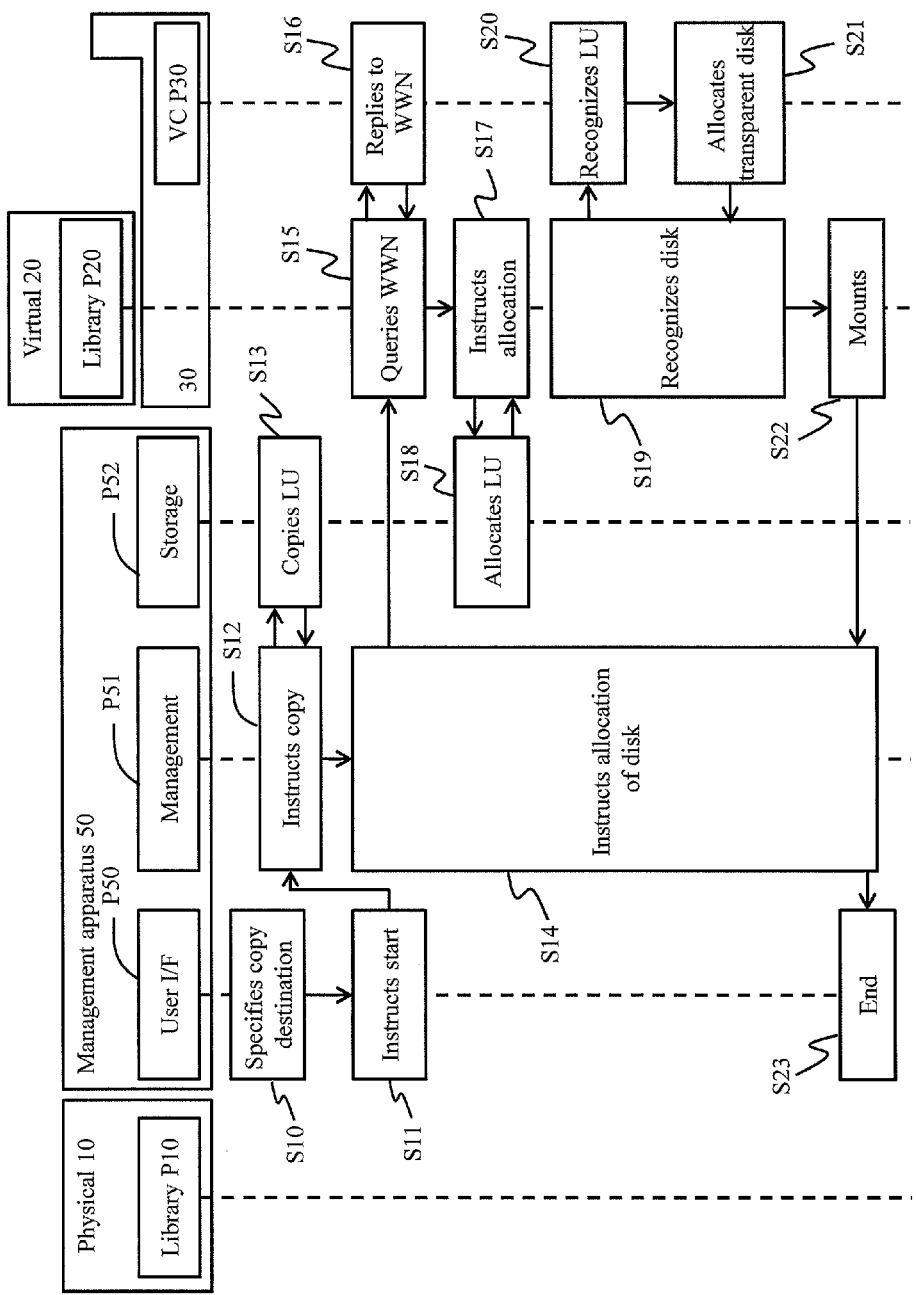
FIG. 10 is an operational schematic diagram showing the overall operation of the system for copying the application program execution environment from the physical higher-level device to the virtual higher-level device.

The operation of the computer system will be explained using the FIGS. 10 through 24. FIG. 10 shows the entire operation (FIG. 1) in a case where an application execution environment is copied from the physical higher-level device 10 to the virtual higher-level device 20. The details of each process shown in FIG. 10 will be explained further below using different drawings. In the drawings, the host library may be abbreviated as library, the user interface module as user I/F, the management modules as management, the storage control module as either storage or storage control, and the virtual platform control module as either VC or virtual platform control.

In FIG. 10, first of all, the user uses the user interface module P50 to specify a copy-destination disk (a copy-destination volume) (S10). When the user specification has been finalized, the user interface module P50 instructs the start of the process for copying the application execution environment (S11).

The management module P51, upon receiving the start instruction from the user interface module P50, instructs the storage control module P52 to start the volume copy (S12).

The storage control module P52 instructs the storage system 40 to create a copy of the logical volume (S13). The storage system 40, which receives this copy creation instruction, creates copy volumes 43 and 44 of the specified logical volumes 41 and 42, and reports to the storage control module P52 to the effect that creation is complete. The storage control module P52 notifies the management module P51 to the effect that the creation of the copy volumes 43 and 44 has been completed.

The management module P51, upon confirming that the copy volumes have been created, instructs the start of processing for allocating the copy volumes to the virtual higher-level device 20, which is the copy destination (S14). When the disk allocation instruction is issued from the management module P51 (S14), the host library P20 of the copy-destination virtual higher-level device 20 queries the virtual platform control module P30 as to the WWN configured in the HBA of the virtual platform 30 (S15). The virtual platform control module P30, upon receiving this query, replies to the host library P20 of the virtual higher-level device 20 with the WWN of the virtual platform 30 (S16).

The host library P20, which has learned the WWN of the virtual platform 30, instructs the storage control module P52 of the management apparatus 50 to allocate the copy volumes 43 and 44 to the virtual platform 30 (S17). The storage control module P52, upon receiving the allocation instruction from the host library P20, provides the allocation instruction to the storage system 40 (S18). The storage system 40, which has received this allocation instruction, associates the LUNs of the copy volumes 43 and 44 with the WWN of the virtual platform 30, and makes a configuration such that the HBA 360 of the virtual platform 30 can access the copy volumes 43 and 44 via the communication network CN2 and the communication port 411.

The host library P20 of the virtual higher-level device 20, upon checking that the copy volumes 43 and 44 have been allocated to the WWN of the virtual platform 30, starts the process for recognizing the disks (S19). The virtual platform control module P30, upon receiving the recognition start instruction from the host library P20, executes a discovery process for recognizing the disks (copy volumes) allocated to the virtual platform 30 (S20).

The virtual platform control module P30, upon discovering the copy volumes 43 and 44, allocates these copy volumes 43 and 44 to the virtual higher-level device 20 as transparent allocation disks (S21). As described hereinabove, the virtual higher-level device 20 can make direct use of the transparent allocation disk (copy volume) without the intervention of the hardware emulator inside the virtual platform 30.

The host library P20 mounts the transparently allocated disks (the copy volumes 43 and 44 here) to the virtual higher-level device 20 (S22). The host library P20 reports to the management module P51 to the effect that the mounting of the copy volumes was successful.

The management module P51, upon receiving the report about the successful mount, ends the processing of the disk allocation instruction normally (S23). The details of the processing of Steps S14 through S23 described hereinabove will be explained further below using FIG. 23.

Figure 11:
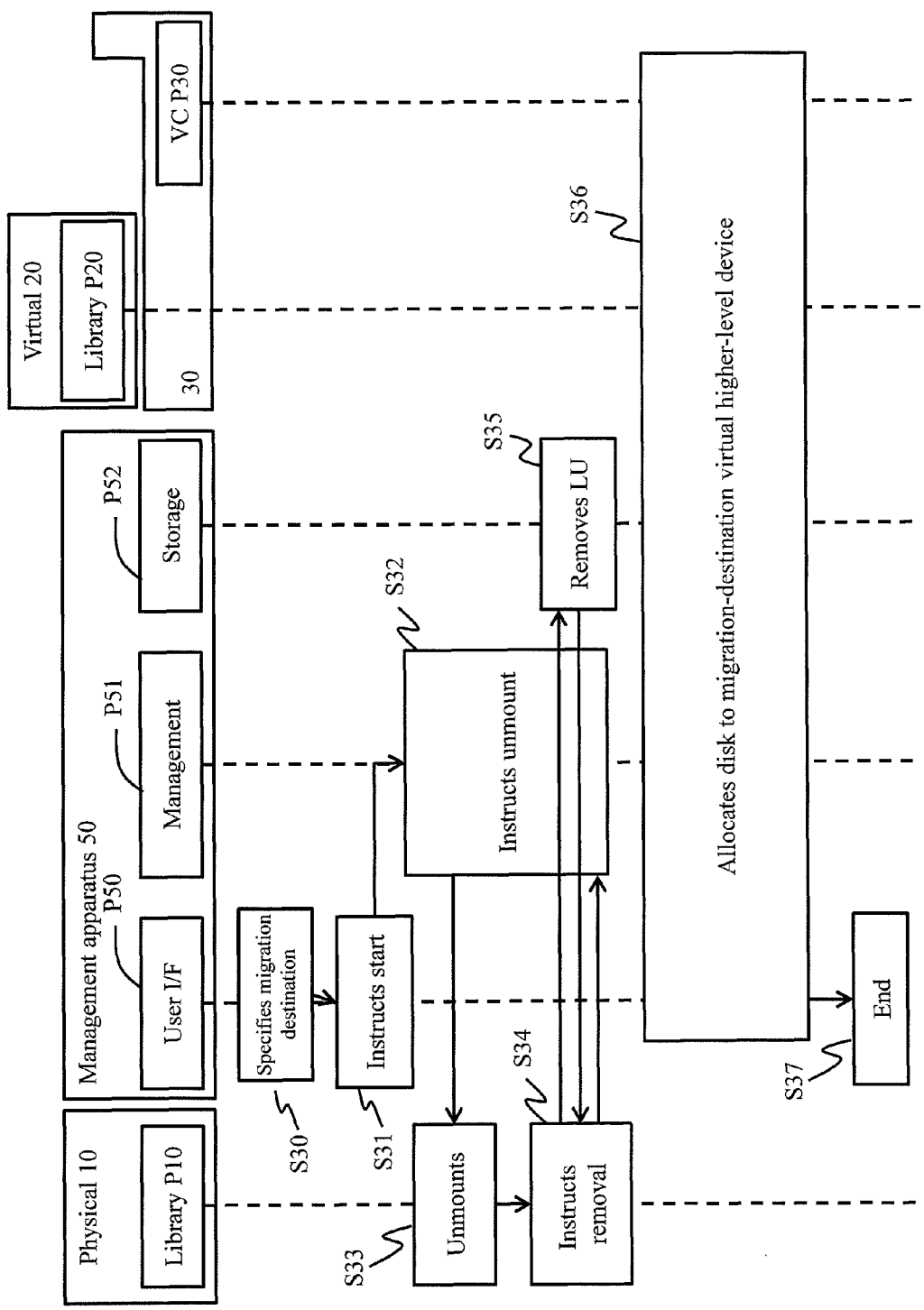
FIG. 11 is an operational schematic diagram showing the overall operation of the system for migrating the application program execution environment from the physical higher-level device to the virtual higher-level device.

FIG. 11 shows the entire operation (FIG. 2) in a case where an application execution environment is migrated from the physical higher-level device 10 to the virtual higher-level device 20.

The user specifies a migration-target disk and a migration destination via the user interface module P50 (S30). In the drawings, the specification of the migration target and the migration destination may be abbreviated as migration destination specification. Here, the migration-target disks are the logical volumes 41 and 42 in the example of FIG. 2.

When the user specification has been finalized, the user interface module P50 instructs the management module P51 to start the processing (S31). The management module P51 instructs the host library P10 of the migration-source physical higher-level device 10 to unmount the logical volumes 41 and 42, which are the migration-target disks (S32).

The host library P10, upon receiving the instruction from the management module P51, unmounts the specified disks 41 and 42 from the physical higher-level device 10 (S33). Next, the host library P10 instructs the storage control module P52 to remove the logical volumes 41 and 42 from the physical higher-level device 10 (S34).

The storage control module P52, upon receiving the instruction from the host library P10, instructs the storage system 40 to delete the associations between the migration-target logical volumes 41 and 42 and the WWN of the migration-source physical higher-level device 10 (S35). That is, the WWN of the migration-source physical higher-level device 10 is deleted from the access control list of the migration-target logical volumes 41 and 42.

The logical volumes 41 and 42, which have been unmounted from the physical higher-level device 10, are transparently allocated to the migration-destination virtual higher-level device 20 in accordance with the method described using FIG. 10 (S36). The contents of Step S36 are the same as those of Steps S14 through S22 shown in FIG. 10. When the migration-target logical volumes 41 and 42 are transparently allocated to the virtual higher-level device 20, the migration processing shown in FIG. 11 ends normally (S37).

Figure 12:
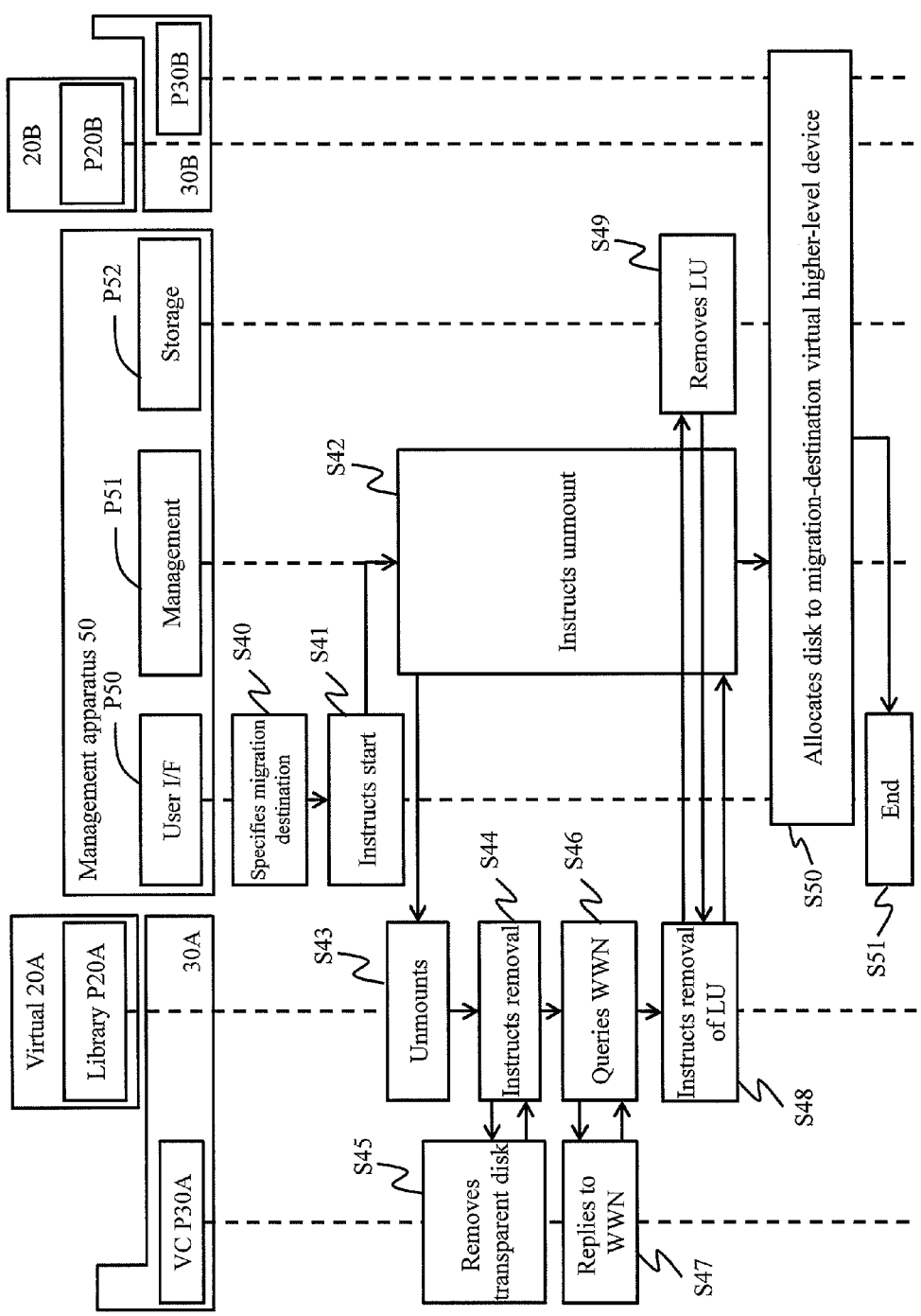
FIG. 12 is an operational schematic diagram showing the overall operation of the system for migrating the application program execution environment from one virtual higher-level device to another virtual higher-level device.

FIG. 12 shows the entire operation (FIG. 3) in a case where an application execution environment is migrated from one virtual higher-level device 20A to another virtual higher-level device 20B.

The user specifies a migration-target disk and a migration destination via the user interface module P50 (S40). When the user specification has been finalized, the user interface module P50 instructs the management module P51 to start the processing (S41). The management module P51 instructs the host library P20A of the migration-source virtual higher-level device 20A to unmount the logical volumes 41 and 42, which are the migration-target disks (S42).

The host library P20A of the migration-source virtual higher-level device 20A, upon receiving the instruction from the management module P51, unmounts the specified disks 41 and 42 from the virtual higher-level device 20A (S43). In addition, the host library P20A instructs the virtual platform control module P30A of the virtual platform 30 to remove the disks 41 and 42 (S44).

The virtual platform control module P30A removes the disks 41 and 42, which had been transparently allocated to the virtual higher-level device 20A, from the virtual higher-level device 20A (S45), and reports to the host library P20A to the effect that the removal is complete.

The host library P20A queries the virtual platform control module P30A as to the WWN to which the migration-target logical volumes 41 and 42 have been coupled (S46). The virtual platform control module P30A replies to the host library P20A with the WWN to which the logical volumes 41 and 42 are coupled (S47).

The host library P20A instructs the storage control module P52 of the management apparatus 50 to delete the association between the LUNs of the logical volumes 41 and 42 and the WWN of the virtual platform 30A (S48).

The storage control module P52, which has received this instruction, instructs the storage system 40 to delete the WWN of the migration-target virtual higher-level device 20A from the access control list for the migration-target logical volumes 41 and 42 (S49).

The logical volumes 41 and 42, which have been unmounted from the virtual higher-level device 20A, are transparently allocated to the migration-destination virtual higher-level device 20B in accordance with the method of FIG. 10 (S50). The contents of Step S50 are the same as those of Steps S14 through S22 shown in FIG. 10. The migration processing shown in FIG. 12 ends normally when the migration-target logical volumes 41 and 42 are transparently allocated to the virtual higher-level device 20B (S51).

Figure 13:
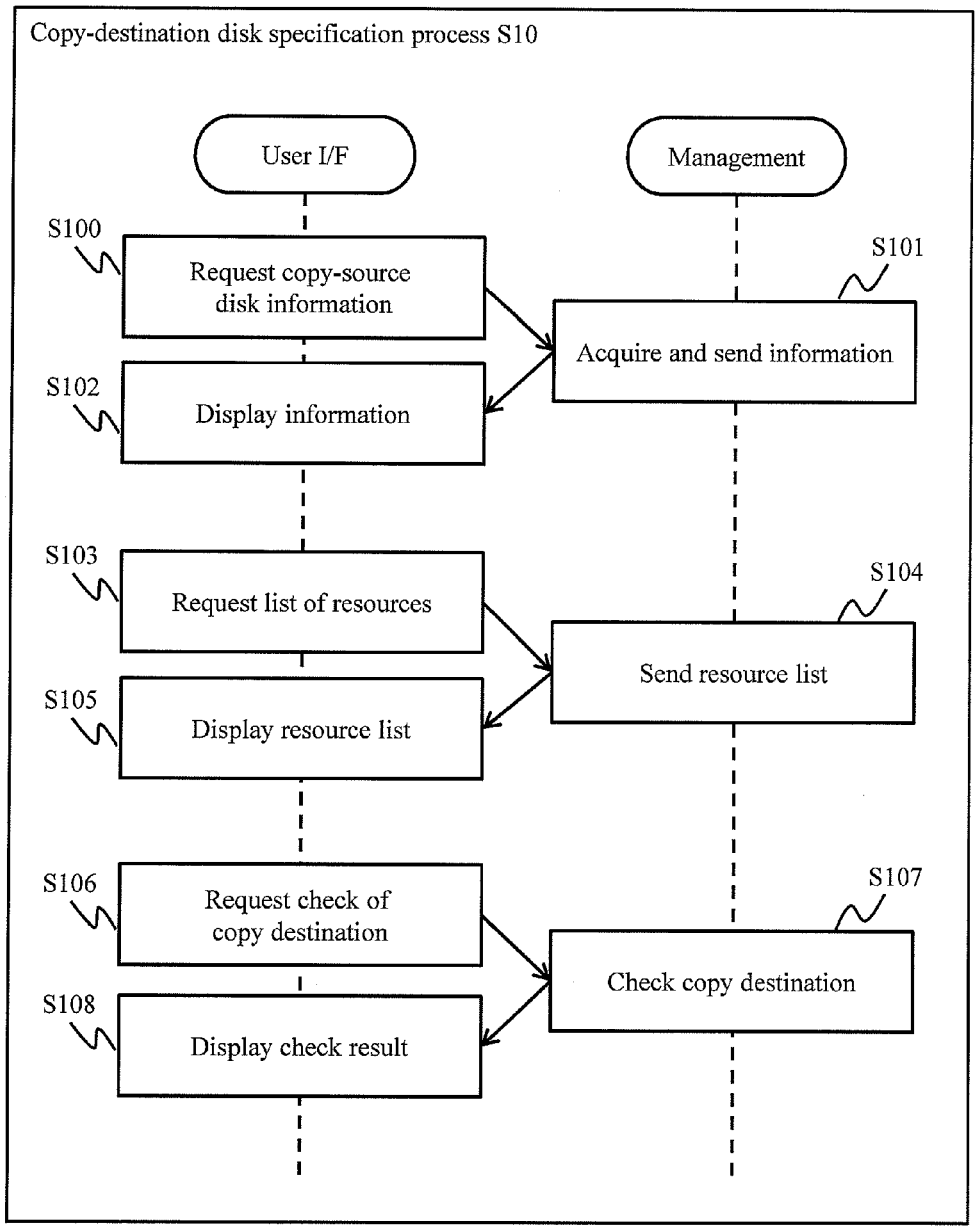
FIG. 13 is a flowchart showing in detail a process for specifying a copy-destination disk.

FIG. 13 is a flowchart showing the details of the copy-destination disk specification process (S10) in FIG. 10. For example, in accordance with an instruction from the user, the user interface module P50 requests that the management module P51 send copy-source disk information (S100). The management module P51 acquires the information with respect to the copy-source disk from the copy-source host library P10, and sends this information to the user interface module P50 as copy-source disk information T10 shown in FIG. 14 (S101). The user interface module P50 displays the copy-source disk information T10 received from the management module P51 on the display device 530 (S102). The details of Step S101 will be explained further below using FIG. 19.

An example of the configuration of the copy-source disk information T10 will be explained using FIG. 14. The copy-source disk information T10, which shows various types of attributes with respect to the copy-source disk (copy-source volume), for example, comprises a mount point C100, volume group information C101, a storage serial number C102, and storage volume information C103.

The mount point C100 is information showing the location where the copy-source disk is mounted in the copy-source higher-level device. The volume group information C101 is for identifying a volume group to which the copy-source disk belongs.

The registration of multiple interrelated logical volumes beforehand as a single volume group makes it possible to execute a volume copy and a migration in volume group units. A case in which "-" is configured in the volume group number C101 shows that the copy-source disk does not belong to the volume group.

The storage serial number C102 is information for identifying the storage system 40 in which the copy-source disk exists. The computer system shown in the drawings only comprises one storage system 40, but in actuality can comprise multiple storage systems 40.

The storage volume information (storage LU information in the drawing) C103 is the identification number of the copy-source disk inside the storage system 40 identified by the storage serial number C102.

Return to FIG. 13. The user interface module P50 requests that the management module P51 send a list of resources (logical volumes) capable of being used by the copy-destination higher-level device (S103). The management module P51 acquires information with respect to usable resources from the copy-destination virtual higher-level device, and sends this information to the user interface module P50 (S104). The user interface module P50 displays the list of resources capable of being used by the copy-destination virtual higher-level device on the display device 530 (S105). The resource list information has been omitted from the drawings, but, for example, information for identifying a logical volume, which the copy-destination virtual higher-level device is able to use, is included in the resource list information.

The user selects a logical volume to be used as the copy destination from among the list of resources presented, and specifies amount point therefor (S106). The management module P51 checks whether the copy destination information specified by the user is appropriate (S107), and returns the result of the check (the determination result) to the user interface module P50. The user interface module P50 displays the check result received from the management module P51 on the display device 530 (S108).

FIG. 15 shows an example of the configuration of the copy-destination disk information T11 specified by the user in Step S106. The copy-destination disk information T11, for example, comprises a copy-destination mount point C110, copy-destination volume group information C111, a storage serial number C112, a new copy-destination volume resource C113, and copy-destination storage volume information C114.

The copy-destination mount point C110 shows the point where the copy volume is mounted in the copy-destination virtual higher-level device. The copy-destination volume group information C111 is for identifying a volume group to which the copy volume belongs. The storage serial number C112 is information for identifying the storage system 40 in which the copy volume exists. The new copy-destination volume resource C113 is information showing which pool in the storage system 40 used by the copy-destination virtual higher-level device is to be used to create a new volume. The copy-destination storage volume information C114 is for identifying a copy volume in the storage system 40.

Figure 16:
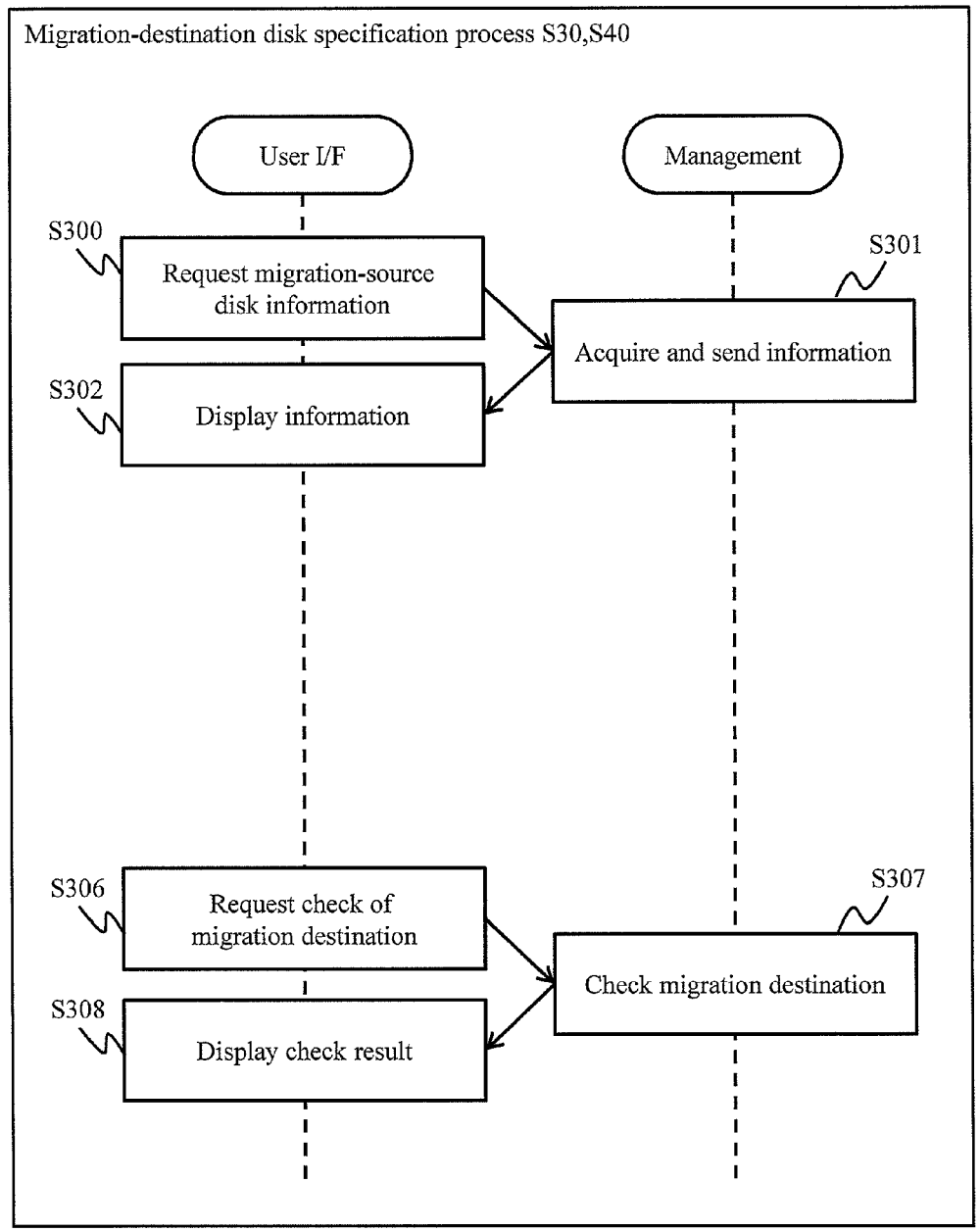
FIG. 16 is a flowchart showing in detail a process for specifying a migration-destination disk.

FIG. 16 is a flowchart of the migration-destination disk specification process shown in Step S30 in FIG. 11 and in Step S40 in FIG. 12.

The user interface module P50 requests that the management module P51 send information with respect to a migration-target volume mounted to the migration-source higher-level device (S300). The management module P51 acquires the information with respect to the migration-target volume from the migration-source higher-level device, and sends this information to the user interface module P50 as migration-source disk information T12 shown in FIG. 17 (S301). The user interface module P50 displays the migration-source disk information T12 received from the management module P51 on the display device 530 (S302).

An example of the migration-source disk information T12 will be explained using FIG. 17. The migration-source disk information T12, for example, comprises a mount point C120, volume group information C121, a storage serial number C122, and storage volume information C123.

The mount point C120 shows the point where the migration-target volume is mounted in the migration-source higher-level device. The volume group information C121 is for identifying the volume group to which the migration-target volume belongs. The storage serial number C122 is information for identifying the storage system 40 in which the migration-target volume exists. The storage volume information C123 is for identifying the migration-target volume in the storage system 40.

Return to FIG. 16. The user interface module P50 requests that the management module P51 check whether the migration-destination disk information specified by the user is appropriate (S306). The management module P51, upon receiving migration-destination information T13 shown in FIG. 18, checks whether the contents thereof are appropriate (S307), and returns the check result to the user interface module P50. The user interface module P50 displays the check result received from the management module P51 on the display device 530 (S308).

An example of the migration-destination disk information T13 will be explained using FIG. 18. The migration-destination disk information T13, for example, can comprise a migration-destination mount point C130, migration-destination volume group information C131, a storage serial number C132, and storage volume information C133.

The migration-destination mount point C130 shows the mount point of the migration-target volume in the migration-destination virtual higher-level device. The migration-destination volume group information C131 is for identifying the volume group to which the migration-target volume belongs. The storage serial number C132 is information for identifying the storage system 40 in which the migration-target volume exists. The storage volume information C133 is for identifying the migration-target volume in the storage system 40.

In this example, a migration-target volume inside the same storage system 40 is migrated from the migration-source higher-level device to the migration-destination virtual higher-level device. However, the present invention is not limited to this, and when using remote copy technology, which will be explained further below, it is possible to remote copy a migration-target volume in one storage system to another storage system. After the remote copy is complete, the deletion of the migration-target volume in the migration-source storage system makes it possible to migrate the volume between different storage systems.

Figure 19:
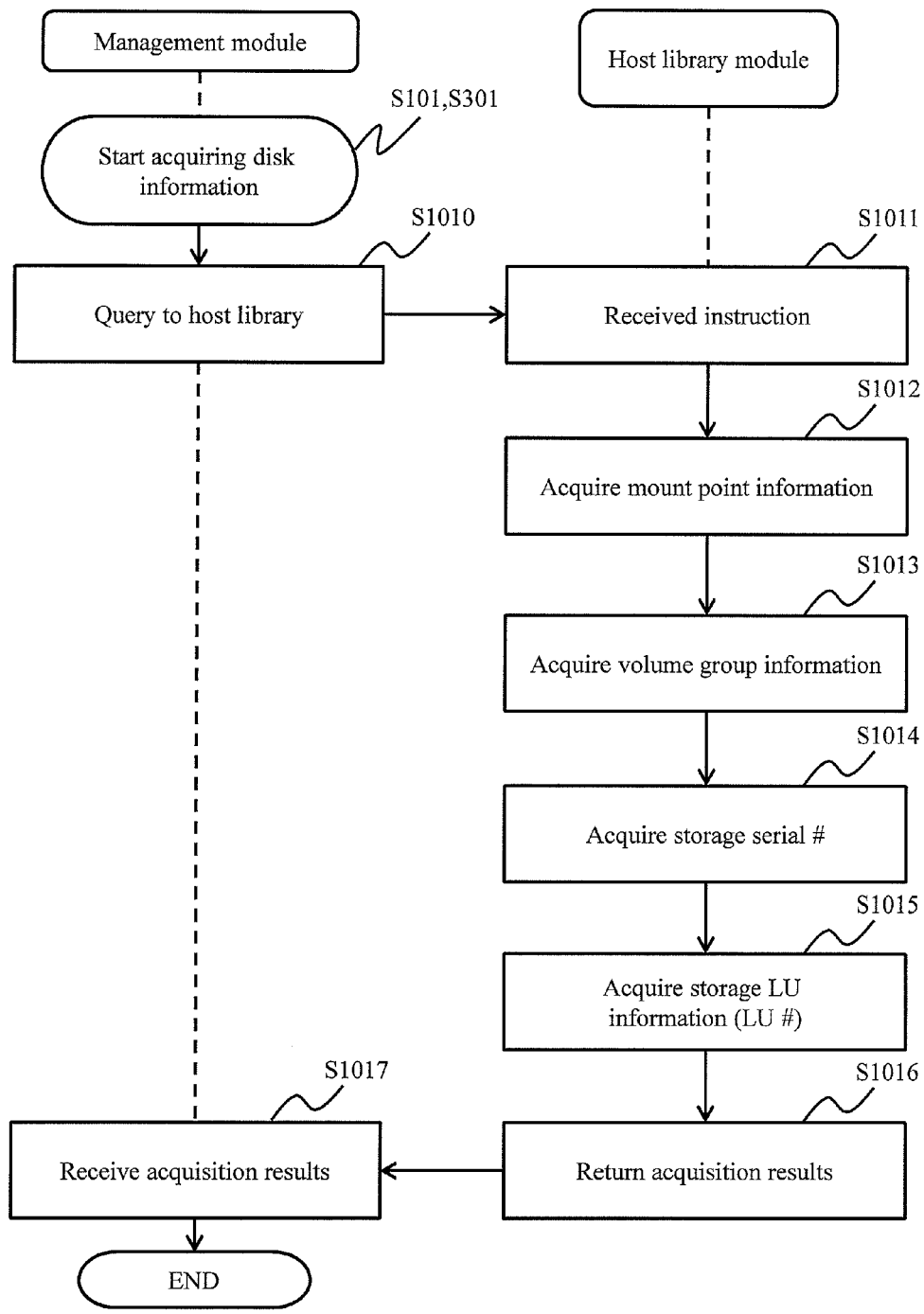
FIG. 19 is a flowchart showing a process for acquiring either copy-source disk information or migration-source disk information.

FIG. 19 is a flowchart of processing for acquiring the disk information shown in Step S101 of FIG. 13 and in Step S301 of FIG. 16.

When the processing for acquiring the disk information (T10 and T12) has started, the management module P51 queries the host library module of either the copy-source higher-level device or the migration-source higher-level device for information (S1010). Either the copy-source higher-level device or the migration-source higher-level device is called the higher-level device (target higher-level device), which is the target of this processing. Either the copy-source volume or the migration-target volume is called the target volume.

The host library module of the target higher-level device, upon receiving the instruction (query request) from the management module P51 (S1011), first acquires the mount point information of the target volume (S1012), and next acquires information on the volume group to which the target volume belongs (S1013). In addition, the host library module of the target higher-level device acquires information for identifying the storage system 40 in which the target volume is disposed (S1014), and acquires the storage volume information (S1015).

The host library module of the target higher-level device sends the information acquired in Steps S1012 through S1015 to the management module P51 (S1016), and the management module P51 acquires and stores the information from the host library module (S1017).

Steps S1012 through S1015 are repeated in proportion to the number of target volumes of the target higher-level device. In a case where the target higher-level device is the virtual higher-level device 20, the host library module P20 can acquire required information from the virtual platform 30 via the virtual platform control module P30.

Figure 20:
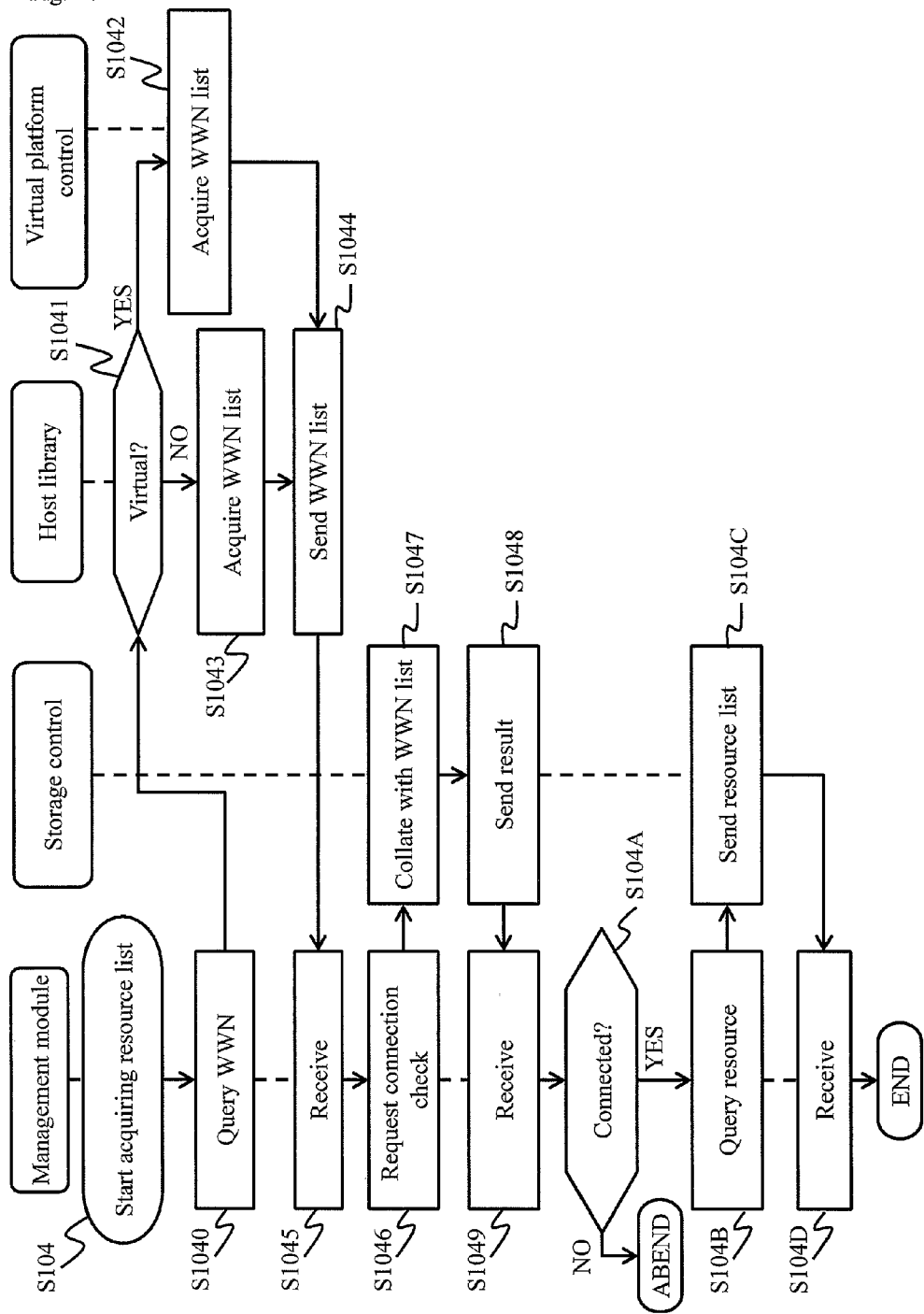
FIG. 20 is a flowchart showing a process for acquiring a usable resource.

FIG. 20 is a flowchart showing the details of Step S104 of FIG. 13. In this example, the explanation focuses on cases in which both the copy-destination higher-level device and the migration-destination higher-level device are virtual higher-level devices 20. Therefore, in the following explanation, the target higher-level device is the virtual higher-level device 20 (or 20B), and the host library module running on the target higher-level device is the host library module P20 (or P20B). However, in this example, the host library module P10 running on the physical higher-level device 10 and the host library module P20 running on the virtual higher-level device 20 are configured as the same module. Therefore, as will be explained below, the present invention comprises a step for determining whether the host library module-operated environment is a virtual environment (virtual higher-level device).

When processing for acquiring the resource list starts (S104), the management module P51 queries the host library module of the higher-level device (target higher-level device), which should acquire the resource list, as to the host WWN (S1040). The host WWN, as was explained above, is the WWN of the higher-level device.

The host library module of the target higher-level device, upon receiving the query request from the management module P51, determines whether its own computer is a virtual environment (S1041). That is, the host library module determines whether the target higher-level device is a physical higher-level device or a virtual higher-level device.

In a case where its own computer is the virtual higher-level device 20, the host library module shown in FIG. 20 is the host library module P20. The host library module P20 requests that the virtual platform control module P30A acquire and send the host WWN (S1041: YES). The virtual platform control module P30A returns a list of host WWNs to the host library module P20 (S1042).

Alternatively, in a case where its own computer is the physical higher-level device 10, the host library module shown in FIG. 20 is the host library module P10. The host library module P10 acquires the list of host WWNs (S1043).

In the case of the physical higher-level device as well as the case of the virtual higher-level device, the host library module sends the host WWN list to the management module P51 (S1044). The management module P51 receives the host WWN list from the host library module (S1045).

The management module P51 requests that the storage control module P52 perform a coupling check to determine whether the host WWN received from the host library module is coupled to the storage system 40 (S1046).

The storage control module P52 collates the WWN list of the HBA, which is coupled to the communication port of the storage system 40, with the list of host WWNs received from the management module P51 (S1047), and sends the collation result to the management module P51 (S1048).

The management module P51 receives the collation result from the storage control module P52 (S1049), and determines whether or not the host WWN is coupled to the storage system 40, that is, whether or not access to the storage system 40 is possible using the HBA comprising the host WWN (S104A).

In a case where the determination is that the host WWN is not coupled to the storage system 40 (S104A: NO), this processing ends abnormally since the target higher-level device does not comprise any usable resources.

In a case where any one of the host WWNs listed in the host WWN list is coupled to the storage system 40 (S104A: YES), the management module P51 queries the storage control module P52 as to a resource (logical volume), which the host WWN is capable of using (S014B).

The storage control module P52 detects a host WWN-usable resource coupled to the storage system 40. That is, the storage control module P52 detects all the logical volumes capable of being used via the communication port 411 to which this host WWN is associated, and sends information on these logical volumes to the management module P51 as a list of usable resources (S104C). The management module P51 receives and stores the usable resource list from the storage control module P52 (S104D), and ends this processing normally.

Figure 21:
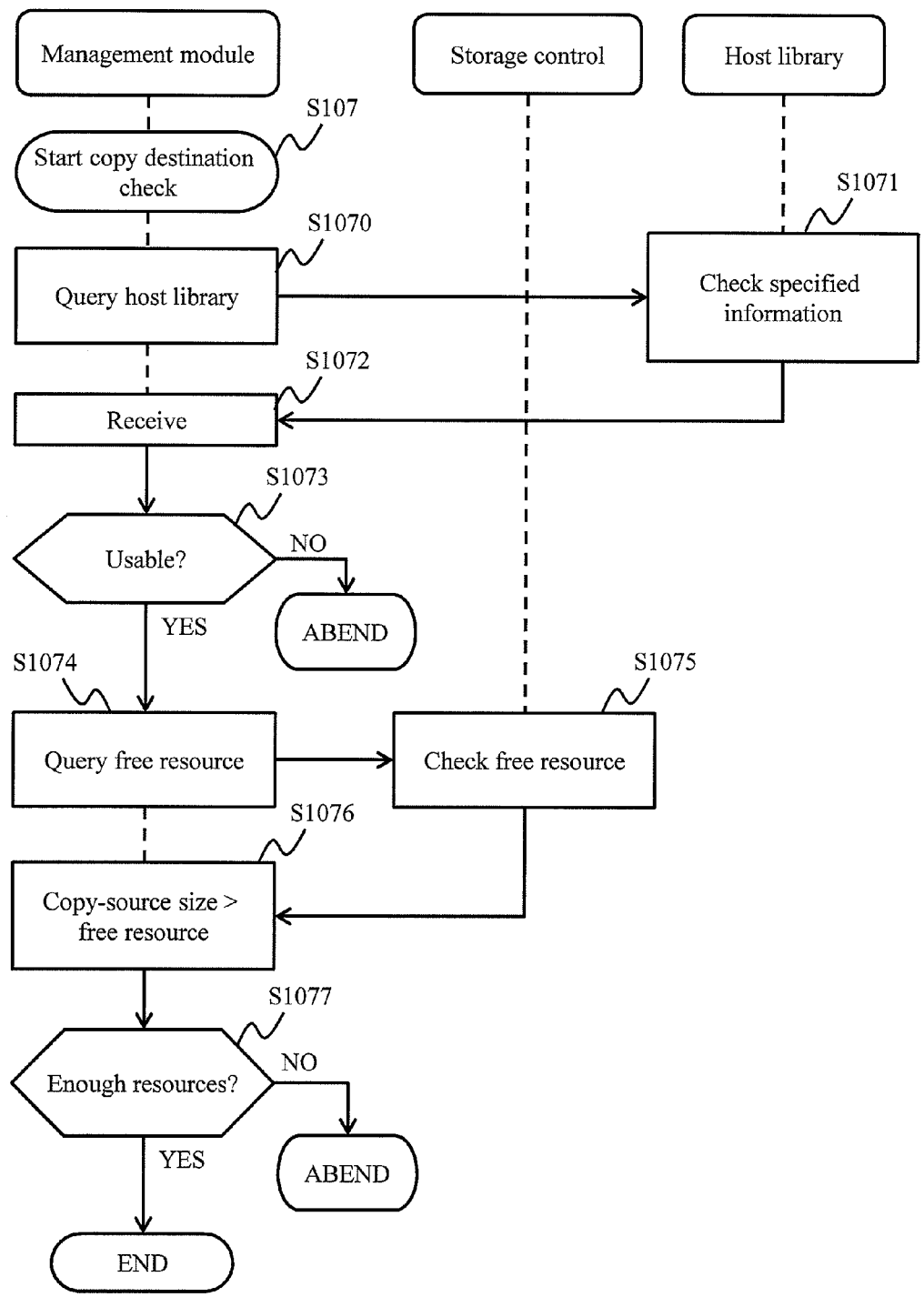
FIG. 21 is a flowchart showing a process for checking whether the information specified as the copy-destination disk is correct.

FIG. 21 is a flowchart showing the details of Step S107 of FIG. 13. When the process for checking whether the contents of the copy-destination disk information T11 (FIG. 15) specified by the user are appropriate has started (S107), the management module P51 queries the host library module P20 of the copy-destination virtual higher-level device 20 (S1070).

The host library module P20 checks whether the mount point and volume group information of the copy-destination disk information T11 received from the management module P51 are usable, and sends this check result to the management module P51 (S1071). For example, in a case where amount point, which is already being used, is configured in the mount point C110 of the copy-destination disk information T11, a determination can be made that this setting is inappropriate. In a case where a usable mount point is selected, a determination can be made that this setting is appropriate.

The management module P51, upon receiving the check result by the host library module P20 (S1072), determines whether the copy-destination disk information T11 specified by the user is usable (whether the setting contents are appropriate) (S1073). In a case where the copy-destination disk information T11 is determined to be unusable (S1073: NO), this processing ends abnormally.

In a case where the copy-destination disk information T11 is determined to be usable (S1073: YES), the management module P51 queries the storage control module P52 as to whether there is a free resource (an unused volume) in the storage system 40 used by the copy-destination virtual higher-level device 20 (S1074).

The storage control module P52 checks whether there is a free resource in the storage system 40 used by the copy-destination virtual higher-level device 20, and sends this check result to the management module P51 (S1075).

The management module P51 compares the size of the copy-target volume (copy-source volume) to the size of the free resource, and determines whether the size of the free resource is larger than the size of the copy-target volume (S1076). In a case where the size of the free resource is determined not to be larger than the size of the copy-target volume (S1076: NO), the management module P51 ends this processing abnormally since it is not possible to create a volume in the copy destination. In a case where the size of the free resource is determined to be larger than the size of the copy-target volume (S1076: YES), a determination is made that there is no problem with the contents of the copy-destination disk information T11, and the management module P51 ends this processing normally.

Figure 22:
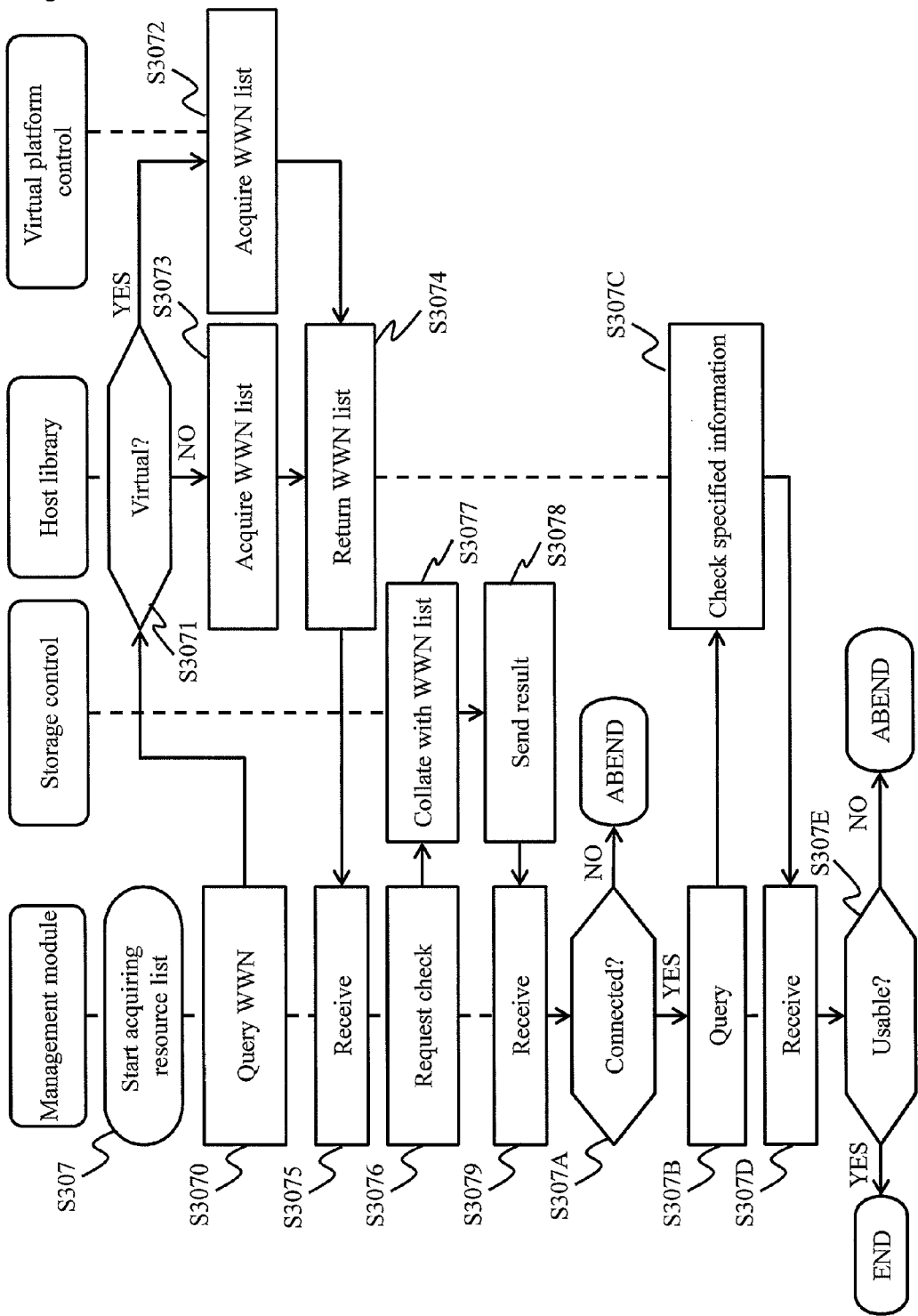
FIG. 22 is a flowchart showing a process for checking whether the information specified as the migration-destination disk is correct.

FIG. 22 shows the details of Step S307 of FIG. 16. When the process for checking whether the contents of the migration-destination disk information T12 (FIG. 17) specified by the user are appropriate has started (S307), the management module P51 queries the host library module P20 of the migration-destination virtual higher-level device 20 as to the host WWN (S3070).

The host library module P20 determines whether its own computer is in a virtual environment (S3071). In a case where the computer in which the host library module P20 exists is the virtual higher-level device 20 (S3071: YES), the host library module P20 requests that the virtual platform control module P30 acquire the host WWN (S3072).

The virtual platform control module P30 acquires the WWN (host WWN) of the virtual platform 30, and sends this WWN to the host library module (S3072). In a case where the host library module is disposed in the physical higher-level device (S3071: NO), the host library module (in this case, the host library module P10) acquires a list of host WWNs (S3073). When the host library module is in the physical higher-level device and when it is in the virtual higher-level device, the host library module sends a list of host WWNs to the management module P51 (S3074).

The management module P51, upon receiving the list of host WWNs from the host library module (S3075), requests that the storage control module P52 check whether the host WWN is coupled to the storage system 40 (S3076).

The storage control module P52 collates the list of host WWNs received from the management module P51 with the list of WWNs coupled to the storage system 40 (S3077), and sends this collation result to the management module P51 (S3078).

The management module P51, upon receiving the collation result from the storage control module P52 (S3079), determines whether any of the host WWNs listed in the list of host WWNs is coupled to the storage system 40 (S307A).

In a case where it has been determined that none of the host WWNs is coupled to the storage system 40 (S307A: NO), that is, a case in which it is not possible to access the storage system 40 via the host WWN, the management module P51 ends this processing abnormally. This is because the setting contents of the migration-destination disk information T12 are in error, and it is not possible to migrate the application execution environment based thereon.

In a case where it has been determined that any one of the host WWNs listed in the host WWN list is coupled to the storage system 40 (S307A), the management module P51 queries the host library module as to whether the contents of the migration-destination disk information T12 are appropriate (S307B).

The host library module checks whether the mount point and volume group information configured in the migration-destination disk information T12 are usable, and sends the result of this check to the management module P51 (S307C).

The management module P51, upon receiving the check result from the host library module (S307D), determines whether the migration-destination virtual higher-level device 20 and storage system 40 are usable (S307E). In a case where it has been determined that the migration-destination virtual higher-level device 20 and the storage system 40 are usable (S307E: YES), this processing ends normally. In a case where it has been determined that the migration-destination virtual higher-level device 20 and the storage system 40 are not usable (S307E: NO), this processing ends abnormally.

Figure 23:
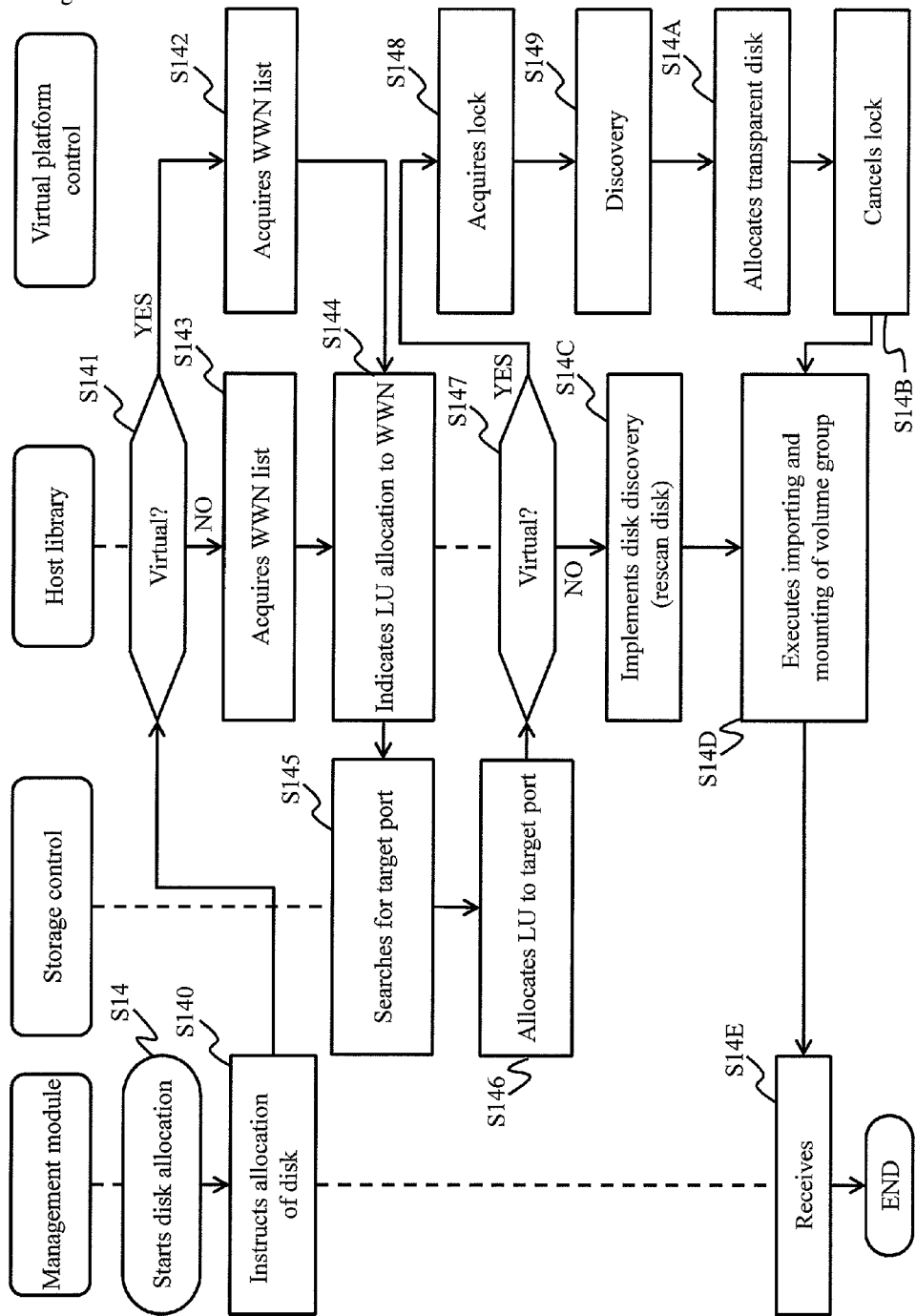
FIG. 23 is a flowchart showing a process for allocating the copy-destination disk to a copy-destination virtual higher-level device.

FIG. 23 is a flowchart showing the details of the series of processes in Steps S14 through S23 of FIG. 10. The series of processes of Steps S14 through S23 will be explained here using Step S14. When the disk allocation process starts (S14), the management module P51 instructs the host library module of the allocation-target higher-level device to execute the disk allocation process (S140).

The host library module, upon receiving the instruction from the management module P51, checks whether its own computer is in a virtual environment (S141). In a case where the host library module is disposed in the virtual higher-level device 20 (S141: YES), the host library module (in this case, the host library module P20) requests that the virtual platform control module P30 acquire the host WWN (S142).

In a case where the host library module is disposed in the physical higher-level device 10 (S141: NO), the host library module (in this case, the host library module P10) acquires the host WWN (S143).

Then, the host library module instructs the storage control module P52 to allocate the allocation-target volume to the acquired host WWN (S144). The host WWN selected as the allocation target from among the host WWNs listed in the host WWN list is called the target WWN.

The storage control module P52, upon receiving the allocation instruction from the host library module, searches for the communication port 411 to which the target WWN is coupled (S145). The storage control module P52 instructs the storage system 40 to allocate the target volume to the discovered communication port 411 (S146). The storage system 40, which has received this instruction, couples the target volume to the communication port 411 coupled to the target WWN. That is, the storage system 40 associates the target volume LUN with this communication port 411, and registers the target WWN in the target volume access control list.

The storage control module P52, after checking the coupling between the target WWN and the target volume, once again determines whether or not its own computer is the virtual higher-level device (S147). In a case where its own computer is the virtual higher-level device 20 (S147: YES), the host library module instructs the virtual platform control module P30 to transparently allocate a disk.

The virtual platform control module P30 acquires a lock for creating a transparent disk (S148). Multiple virtual higher-level devices 20 can be disposed on a single virtual platform 30, and the host library P20 performs parallel operations. Therefore, there is the likelihood that prior to allocating a transparent disk in accordance with an instruction from a certain host library, a transparent disk will have been allocated to the virtual higher-level device in accordance with a separate instruction from another host library.

Consequently, in this example, a lock is acquired when transparently allocating the target volume to the virtual higher-level device 20.

The virtual platform control module P30, for example, executes a process for detecting the disk (target volume), like a process for rescanning the disk (S149). The virtual platform control module P30 transparently allocates the disk detected in Step S149 to the target virtual higher-level device 20 (S14A). Thereafter, the virtual platform control module P30 cancels the lock acquired in Step S148 (S14B).

In a case where its own computer is the physical higher-level device 10 rather than the virtual higher-level device 20 (S147: NO), the host library module executes the above-mentioned rescan process, detects the disk, and mounts the detected disk in the physical higher-level device 10.

The host library module checks that the target disk (target volume) has been allocated to the target higher-level device. In a case where the target disk belongs to a volume group, the host library module imports this volume group, and executes a process for mounting another disk belonging to this volume group (S14D). In accordance with this, ultimately multiple associated volumes are collectively allocated to the target higher-level device.

Figure 24:
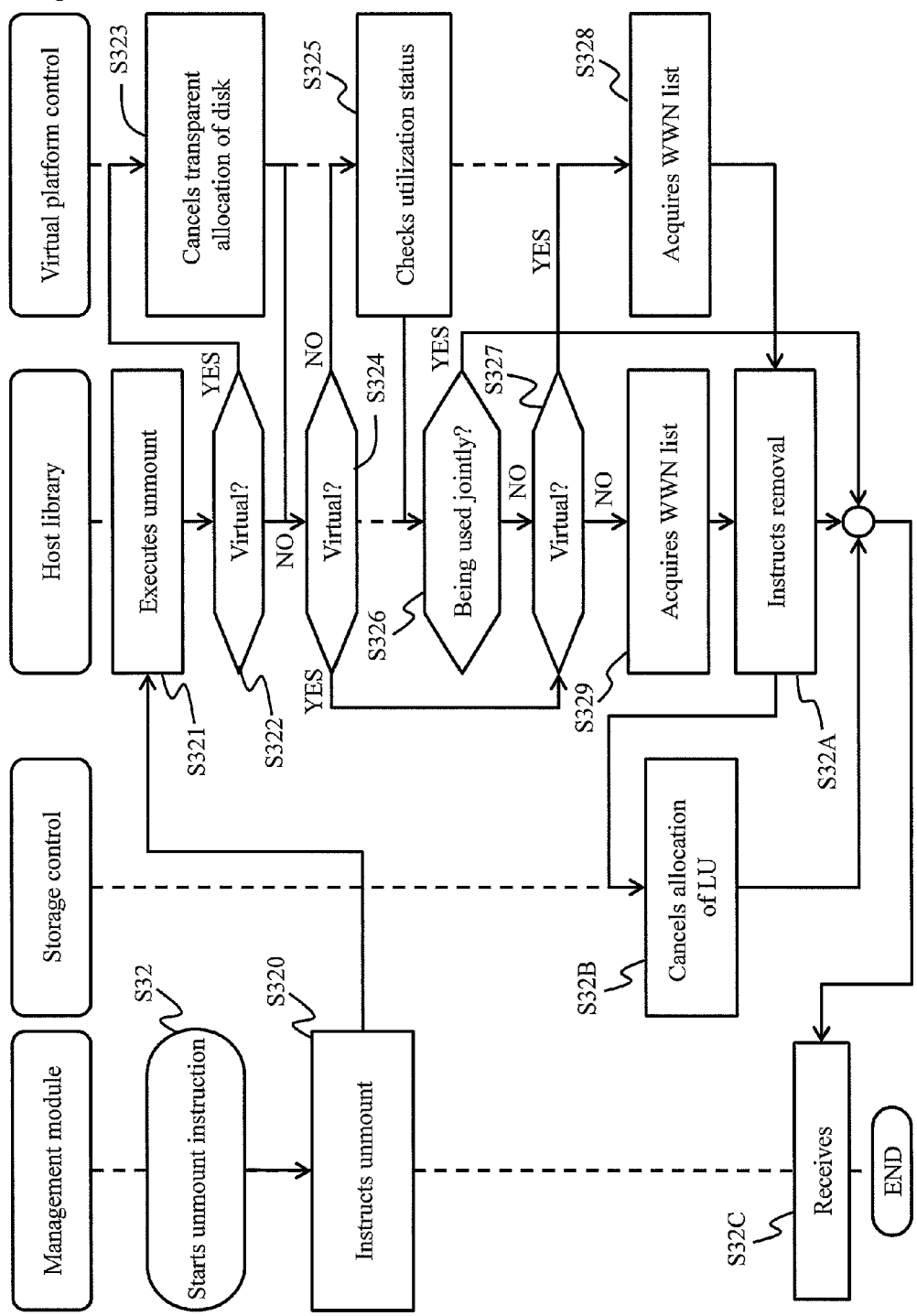
FIG. 24 is a flowchart showing a process for issuing an instruction for removing a migration-target disk from a migration-source higher-level device.

FIG. 24 is a flowchart showing either the series of processes in Steps S32 through S34 of FIG. 12 or the series of processes in Steps S42 through S49 of FIG. 13. The series of processes for removing a disk from the higher-level device will be explained here using Step S32.

When the unmount process starts (S32), the management module P51 instructs the host library module of the higher-level device to which the unmount-target disk is mounted to remove the target disk (S320).

The host library module, upon receiving the instruction from the management module P51, exports the volume group, and unmounts the target disk (S321). Next, the host library module determines whether its own computer is the virtual higher-level device 20 (S322). In a case where it has been determined that its own computer is the virtual higher-level device 20 (S322: YES), the host library module instructs the virtual platform control module P30 to cancel the allocation of the transparently allocated disk.

The virtual platform control module P30 receives the instruction from the host library module and cancels the transparent allocation of the target disk (S323). The host library module, having checked that the allocation of the target disk has been canceled, determines once again whether its own computer is the virtual higher-level device 20 (S324).

In a case where it has been determined that its own computer is the virtual higher-level device 20 (S324: YES), the host library module instructs the virtual platform control module P30 to check the utilization status of the allocation-canceled disk with respect to another virtual higher-level device. The virtual platform control module P30, which has received this instruction, checks whether another virtual higher-level device 20 is using the allocation-canceled disk, and reports the result of this check to the host library module (S325).

The host library module, based on the check result from the virtual platform control module P30, determines whether another virtual higher-level device is using the unmounted disk (the disk transparently allocated to the virtual higher-level device) (S326).

In a case where the unmounted disk is being jointly used (S326: YES), the host library module reports to the management module P51 to the effect that the unmount process is complete without advancing the processing further. The management module P51 receives this report (S32C), and ends this processing normally. Since another virtual higher-level device 20 is using the unmount-target disk, the connection between the virtual platform 30 and the storage system 40 logical volume (the unmount-target disk) cannot be disconnected.

In a case where the unmounted disk is not being used by another virtual higher-level device 20 (S326: NO), the host library module determines once again whether its own computer is the virtual higher-level device 20 (S327).

In a case where it has been determined that its own computer is the virtual higher-level device 20 (S327: YES), the host library module requests that the virtual platform control module P30 acquire the host WWN associated with the unmounted disk. The virtual platform control module P30 acquires the host WWN and sends this host WWN to the host library module (S328). In a case where it has been determined that its own computer is not the virtual higher-level device 20 (S327: NO), the host library module acquires the host WWN associated with the unmounted disk (S329).

The host library module instructs the storage control module P52 to remove the logical volume (unmounted disk) in the storage system 40 from the target host WWN (S32A).

The storage control module P52 cancels the association between the indicated logical volume LUN and the target host WWN (S32B). That is, the target host WWN is deleted from the indicated logical volume access control list. Thereafter, the host library module reports to the management module P51 to the effect that the allocation process has been canceled. The management module P51 receives this report (S32C) and ends this processing normally.

In accordance with configuring this example like this, it is possible to relatively easily, and automatically either copy or migrate an application execution environment either from the physical higher-level device 10 to the virtual higher-level device 20, or from the virtual higher-level device 20A to the virtual higher-level device 20B.

EXAMPLE 2

Figure 25:
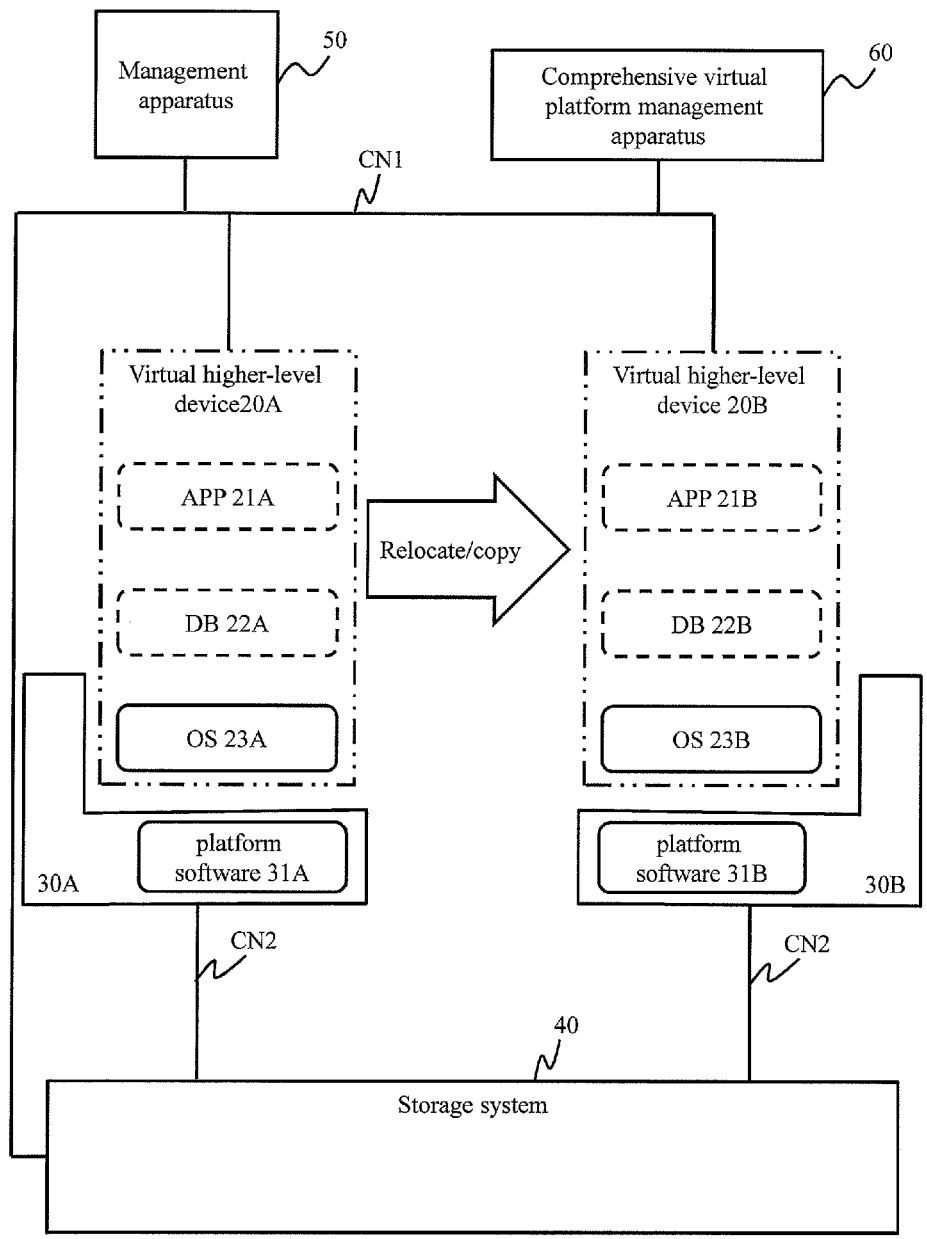
FIG. 25 is a block diagram of a computer system related to a second example comprising a configuration for using a single comprehensive virtual platform management apparatus to manage multiple virtual platforms.
Figure 26:
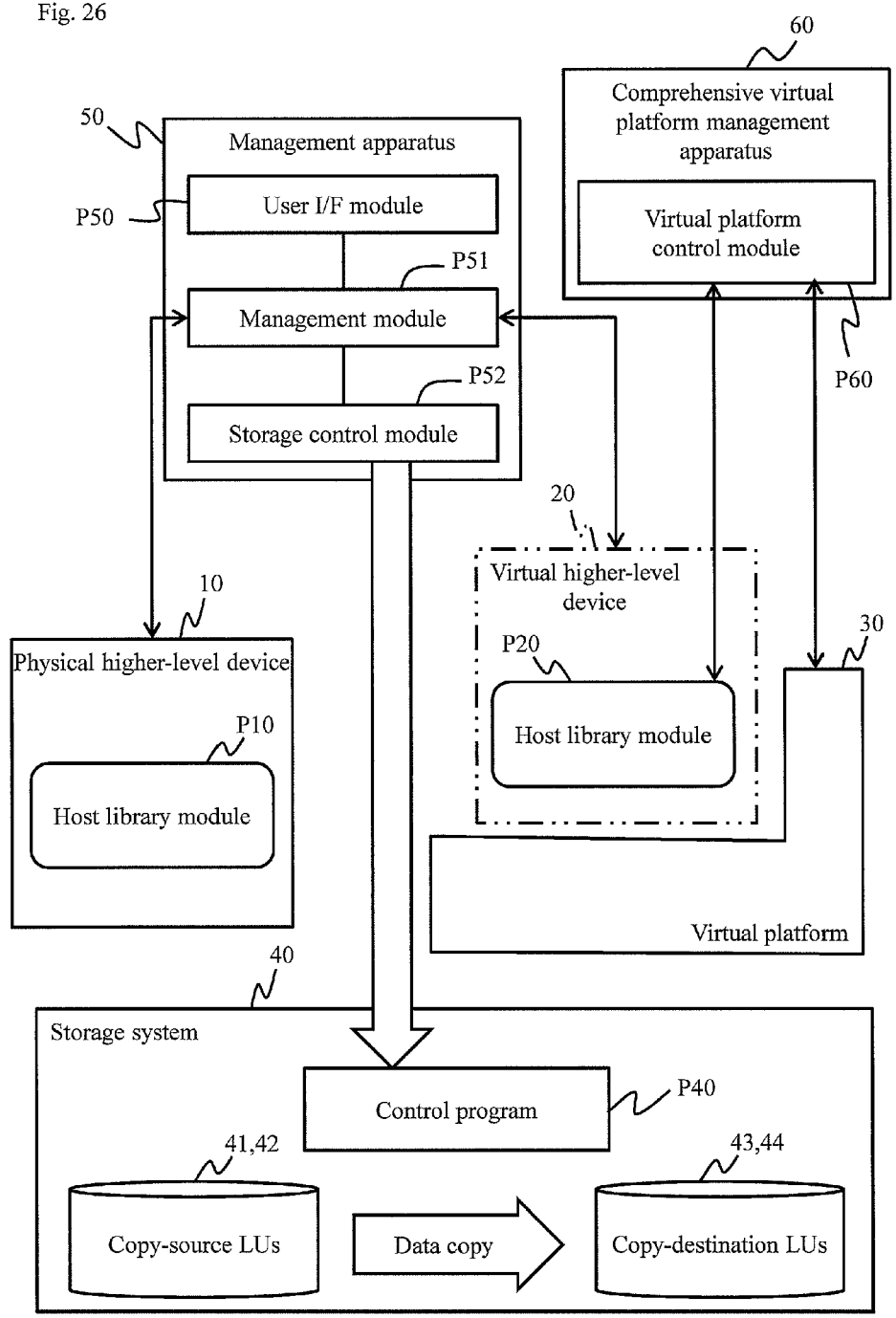
FIG. 26 is a software block diagram of a computer system.

A second example will be explained using FIGS. 25 and 26. This example is equivalent to a variation of the first example, and as such, the explanation will focus on the differences with the first example. As shown in the system block diagram of FIG. 25, the computer system of this example comprises a comprehensive virtual platform management apparatus 60 for comprehensively managing multiple virtual platforms 30. FIG. 25 shows an example of a computer system comprising multiple virtual higher-level devices 20A and 20B. FIG. 26 shows an example of a computer system comprising a physical higher-level device 10 and a virtual higher-level device 20.

As shown in the software block diagram of FIG. 26, the comprehensive virtual platform management apparatus 60 comprises a virtual platform control module P60. Unlike the first example, the virtual platform 30 does not comprise the virtual platform control module P30. The virtual platform 30 is managed by the virtual platform control module P60 in the comprehensive virtual platform management apparatus 60. The virtual platform control module P60 comprises at least a function for acquiring a WWN (host WWN) from the virtual platform 30 under its management, and functions for creating and canceling a transparently allocated disk using the virtual platform 30 under its management.

Configuring this example like this also achieves the same effects as the first example. In addition, in this example, a virtual platform control module P60 is disposed in a comprehensive virtual platform management apparatus 60, and the creation and so forth of a transparently allocated disk is performed across-the-board in the virtual platforms 30 under its management, thereby doing away with the need to load the virtual platform control module P30 into each virtual platform 30. Therefore, in a computer system such as a data center, which comprises large numbers of virtual platforms 30, it is possible to simplify the system configuration and to enhance the efficiency of maintenance work.

EXAMPLE 3

Figure 27:
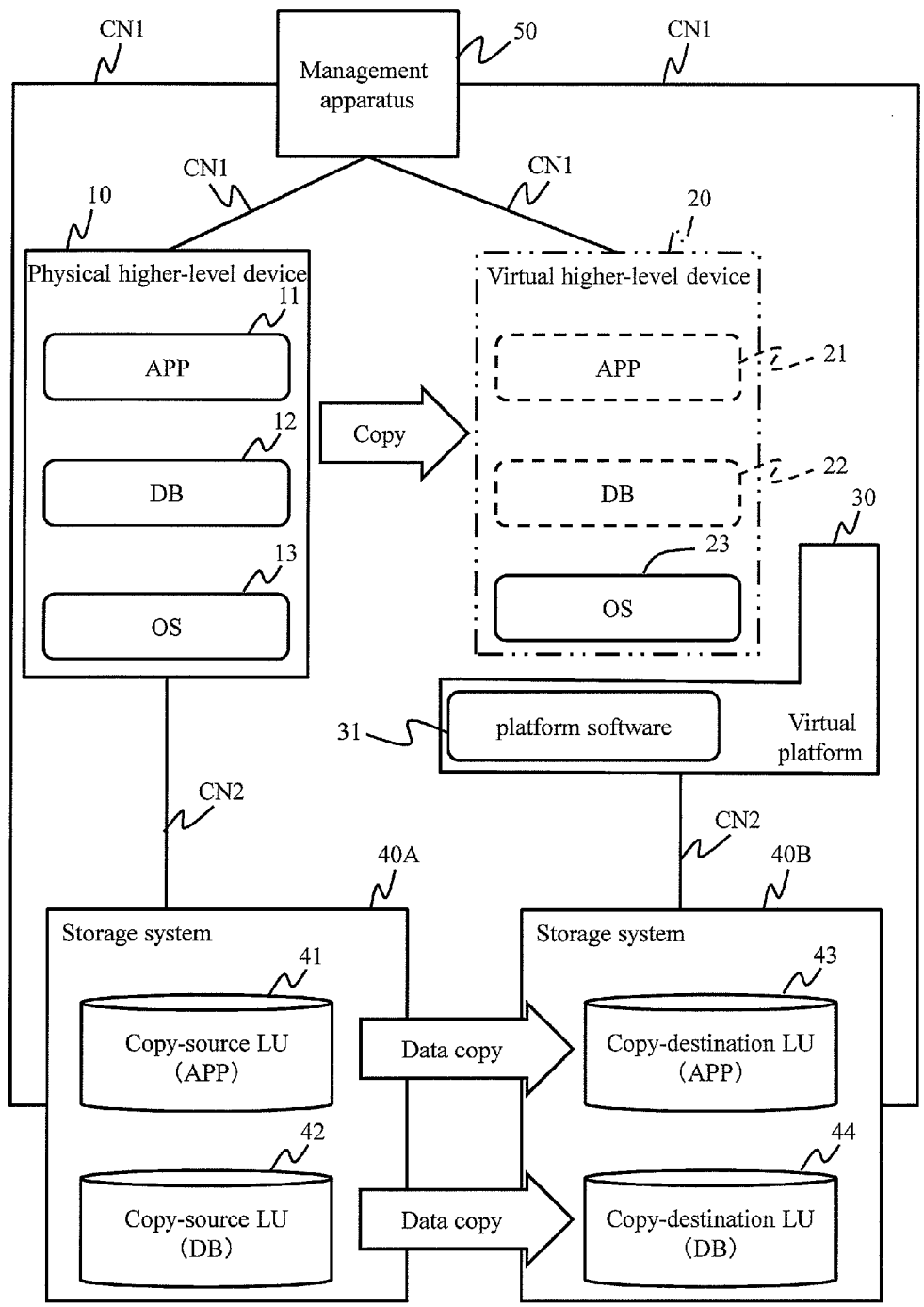
FIG. 27 is a block diagram of a computer system related to a third example for remote copying a prescribed logical volume from one storage system to another storage system.

A third example will be explained using FIGS. 27 through 29. In this example, an example, which uses a remote copy, will be explained. FIG. 27 is a block diagram of the entire computer system of this example. The computer system comprises multiple storage systems 40A and 40B. The one storage system 40A is used by the one higher-level device 10, and the other storage system 40B is used by the other higher-level device 20. The one storage system 40A may be called the first storage system, and the other storage system 40B may be called the second storage system.

In a case where an application execution environment is either copied or migrated from the one higher-level device 10 to the other higher-level device 20, data in the logical volumes 41 and 42 of the one storage system 40A are remote copied to free logical volumes 43 and 44 in the other storage system 40B.

The higher-level device 10 and the storage system 40A can be disposed in a physically separate location from the higher-level device 20 and the storage system 40B. This makes it possible, for example, to build the same environment as the production environment at a remote site distantly separate from a local site, where the production environment is installed (the higher-level device 10 and the storage system 40A).

A S104(RC), which is a process for acquiring a list of usable resources from a remote copy-destination higher-level device, will be explained using FIG. 28. The processing of FIG. 28 comprises Steps S1040 through S104D in common with the processing described using FIG. 20. In addition, the processing of FIG. 28 comprises a new Step S104E between Step S1047 and Step S1048.

In this example, after checking that the host WWN of the remote copy-destination virtual higher-level device 20B is coupled to the remote copy-destination storage system 40B (S1047), the management module P51 checks whether the remote copy-source storage system 40A and the remote copy-destination storage system 40B are communicably coupled (S104E). That is, the management module P51 checks whether or not a remote copy is possible from the remote copy-source storage system 40A to the remote copy-destination storage system 40B.

A S307(RC), which is a process for checking whether the setting contents of the migration-destination disk information T12 specified by the user are appropriate, will be explained using FIG. 29. The processing of FIG. 29 comprises Steps S3070 through S307E in common with the processing described using FIG. 22. In addition, the processing of FIG. 29 comprises a new Step S307F between Step S3077 and Step S3078.

Figure 28:
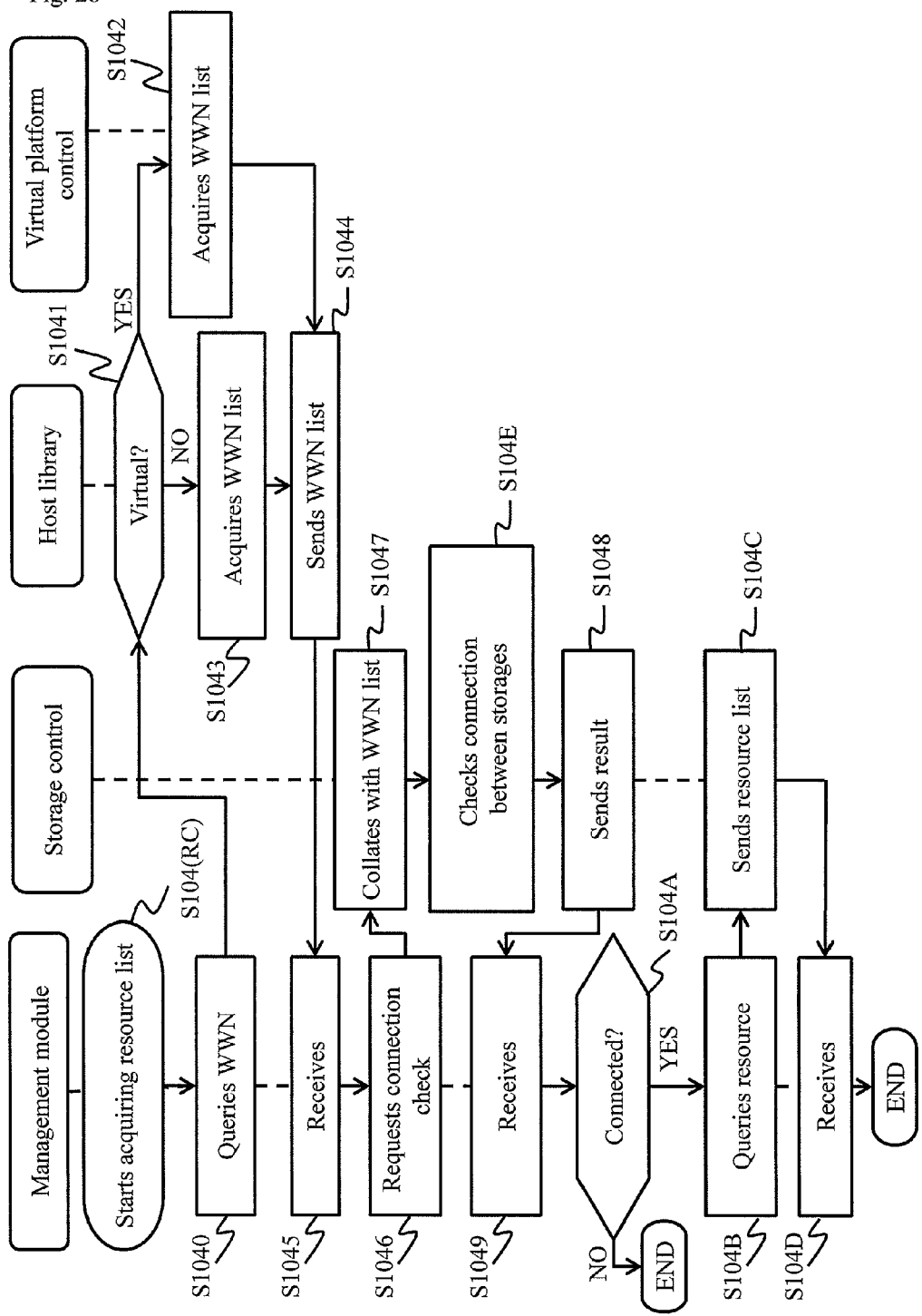
FIG. 28 is a flowchart showing a process by which a virtual computer corresponding to a remote copy-destination storage system acquires a usable resource.
Figure 29:
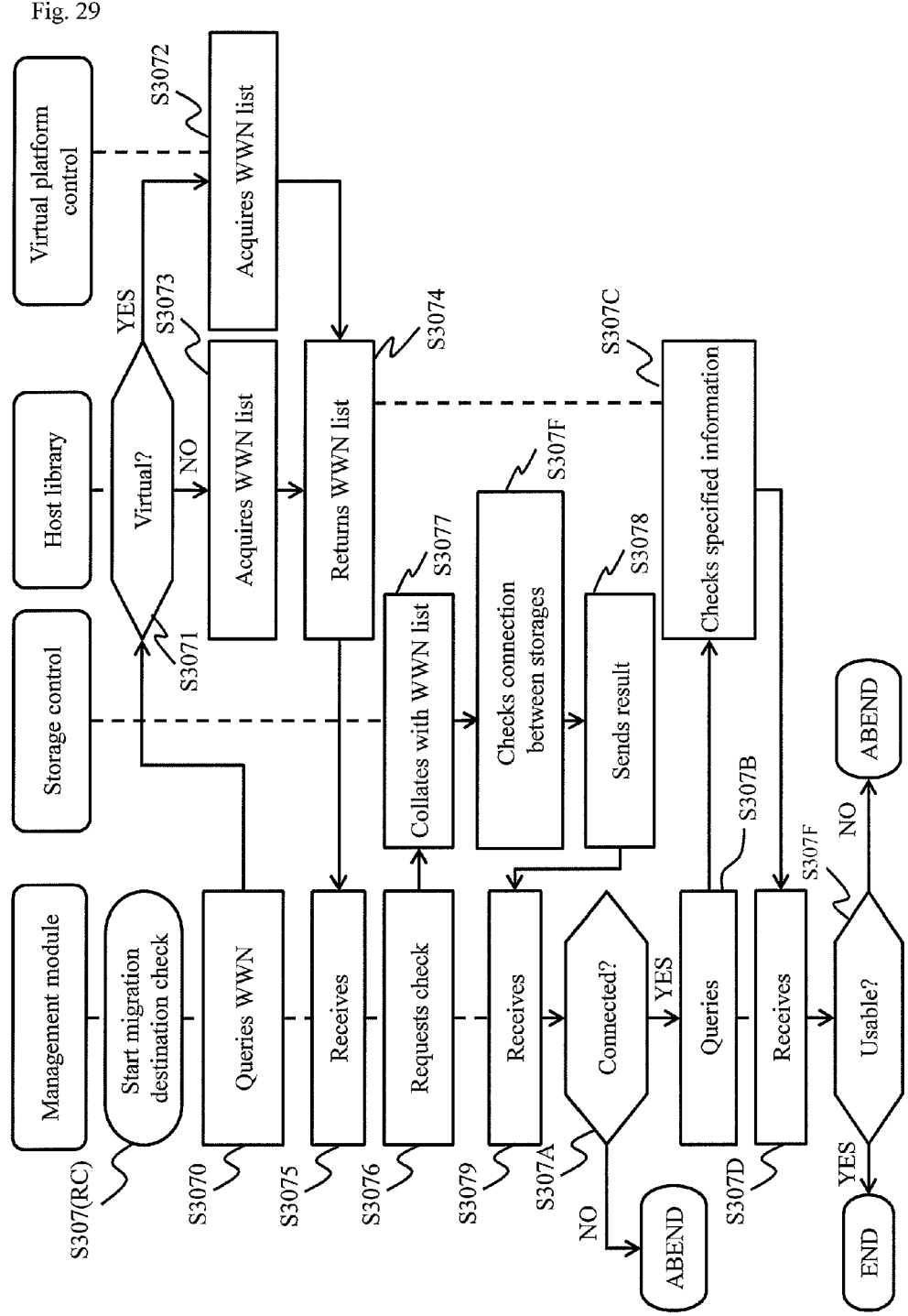
FIG. 29 is a flowchart showing a process for checking whether information of a disk specified as the remote copy destination is correct.

The same as was described using FIG. 28, after checking that the host WWN of the remote copy-destination virtual higher-level device 20B is coupled to the remote copy-destination storage system 40B (S3077), the management module P51 checks whether the remote copy-source storage system 40A and the remote copy-destination storage system 40B are coupled to enable a remote copy (S307F).

Configuring this example like this also achieves the same effects as the first example. In addition, in this example, the use of a remote copy makes it possible to either copy or migrate the application execution environment of the one higher-level device to another higher-level device in a remote location, enhancing usability.

The present invention is not limited to the examples described hereinabove. A person with ordinary skill in the art will be able to make various additions and changes without departing from the scope of the present invention. For example, the above-described technical features of the present invention can be put into practice by appropriately combining these features.

REFERENCE SIGNS LIST

10 Physical higher-level device
11 Application program
12 Database
20, 20A, 20B Virtual higher-level device
21 Application program
22 Database
30, 30A, 30B Virtual platform
40, 40A, 40B Storage system
41, 42, 43, 44 Logical volume
Management apparatus
P50 User interface module
P51 Management module
P52 Storage control module
P10, P20, P20A, P20B Host library module
P30, P30A, P30B, P60 Virtual platform control module

The invention claimed is:
1. A computer system, which migrates an application program execution environment from a first computer to a second computer,
wherein the second computer is configured as a virtual computer, which is disposed on a virtual platform for providing a virtual computer,
the computer system comprising:
a storage control apparatus for storing prescribed data related to the application program; and
a management computer, which is communicably coupled to the storage control apparatus, the first computer, and the second computer, and manages the storage control apparatus, the first computer, and the second computer,
wherein the management computer executes:
a volume preparation process for preparing, in the storage control apparatus, a prescribed logical volume for storing the prescribed data so as to make it possible for the second computer to use the prescribed data related to the application program;
a coupling process for communicably coupling a communication interface part of the virtual platform to a communication port part, which is in the storage control apparatus and corresponds to the prescribed logical volume, so as to make it possible to access the prescribed logical volume prepared in the storage control apparatus via the virtual platform; and an allocation process for transparently allocating the prescribed logical volume to the second computer;

wherein the management computer executes a specification process prior to the volume preparation process, wherein, in the specification process, in a case where the application program execution environment of the first computer is to be copied to the second computer, information related to a logical volume used by the first computer is acquired from the first computer and presented to a user as copy-source volume candidate information, communication interface identification information for identifying the communication interface part capable of being used by the second computer is acquired from the second computer, a determination is made as to whether there is a communication port part corresponding to the communication interface identification information by querying the storage control apparatus by showing the communication interface identification information, in a case where it has been determined that the communication port part corresponding to the communication interface identification information exists, a list of logical volumes associated with the communication port part is acquired from the storage control apparatus, and presented to the user as copy-destination volume candidate information, a determination is made as to whether a copy-destination volume selected by the user from among the copy-destination candidate information is usable by querying the storage control apparatus by showing information for identifying the selected copy-destination volume, and in a case where it has been determined that the copy-destination volume is usable, information for identifying the prescribed logical volume selected by the user from among the copy-source volume information and information for identifying the copy-destination volume which has been determined to be usable are associated with each other and transferred to the volume preparation process.

2. A computer system according to claim 1, wherein, in the volume preparation process, in a case where the application program execution environment of the first computer is to be copied to the second computer, the prescribed logical volume is prepared in the storage control apparatus by creating, in the storage control apparatus, a copy volume of the logical volume for storing the prescribed data related to the application program, and in a case where the application program execution environment of the first computer is to be migrated from the first computer to the second computer, the prescribed logical volume is prepared in the storage control apparatus by unmounting the logical volume for storing the prescribed data related to the application program from the first computer.

3. A computer system according to claim 2, wherein, in the coupling process, the second computer acquires communication interface identification information for identifying the communication interface part from the virtual platform in accordance with an instruction from the management computer, and sends the acquired communication interface identification information to the management computer, and the management computer instructs the storage control apparatus to allocate the communication interface identification information received from the second computer, to the communication port part corresponding to the prescribed logical volume.

4. A computer system according to claim 3, wherein, in the allocation process, the virtual platform acquires a lock for allocating, to the second computer, the prescribed logical volume which is coupled to the virtual platform via the communication interface part, executes a discovery process for discovering the prescribed logical volume coupled to the virtual platform, transparently allocates the prescribed logical volume discovered by the discovery process, to the second computer via the virtual platform, and cancels the lock thereafter.

5. A computer system according to claim 2, wherein the first computer and the second computer are coupled to the storage control apparatus via a communication network, and in the volume preparation process, in a case where the application program execution environment of the first computer is to be copied to the second computer, the first computer accesses the prescribed logical volume via the communication network, and the second computer accesses the copy volume via the virtual platform and the communication network.

6. A computer system according to claim 2, wherein the first computer is coupled via a communication network to the storage control apparatus for storing the prescribed data, and the second computer is coupled to another storage control apparatus via the virtual platform and the communication network, and in the volume preparation process, in a case where the application program execution environment of the first computer is to be copied to the second computer, it is checked that a remote copy is possible between the prescribed logical volume of the storage control apparatus coupled to the first computer and another logical volume of the other storage control apparatus coupled to the second computer, and thereafter the copy volume is created by remote copying data of the prescribed logical volume to the other logical volume.

7. A computer system according to claim 6, wherein the management computer executes a specification process prior to the volume preparation process, wherein, in the specification process, in a case where the application program execution environment of the first computer is to be remote copied to the second computer, information related to a logical volume used by the first computer is acquired from the first computer and presented to a user as remote copy-source volume candidate information, communication interface identification information for identifying the communication interface part, which is able to be used by the second computer, is acquired from the second computer, a determination is made as to whether there is a communication port part corresponding to the communication interface identification information by querying the other storage control apparatus by showing the communication interface identification information, in a case where it has been determined that the communication port part corresponding to the communication interface identification information exists, a determination is made as to whether a remote copy is possible between the storage control apparatus used by the first computer and the other storage control apparatus used by the second computer, in a case where it has been determined that a remote copy is possible between the storage control apparatus and the other storage control apparatus, a list of the other logical volumes associated with the communication port part of the other storage control apparatus is acquired from the storage control apparatus and presented to the user as remote copy-destination volume candidate information, a determination is made as to whether the other logical volume selected by the user from among the remote copy-destination candidate information is usable as a remote copy-destination volume by querying the other storage control apparatus by showing information for identifying the selected other logical volume, and in a case where it has been determined that the other logical volume is usable as the remote copy-destination volume, information for identifying the prescribed logical volume selected by the user from among the remote copy-source volume information and information for identifying the remote copy-destination volume which has been determined to be usable are associated with each other and transferred to the volume preparation process.

8. A computer system according to claim 3, wherein the first computer and the second computer comprise an allocation control part for controlling the allocation of a logical volume by communicating with the management computer, wherein the allocation control part:

determines whether its own computer is a physical computer or a virtual computer in a case where a query has been received with respect to a usable communication interface part;

in a case where it has been determined that its own computer is the physical computer, acquires information for identifying a communication interface part and sends this information to the management computer; and in a case where it has been determined that its own computer is the virtual computer, acquires information for identifying the communication interface part from the virtual platform, and sends this information to the management computer.

9. A computer system according to claim 1, wherein in the allocation process, the prescribed logical volume is transparently allocated to the second computer by coupling the communication interface part coupled to the prescribed logical volume to the second computer as a virtual communication interface part.

10. A computer system according to claim 1, wherein a virtual platform control part for controlling the virtual platform is disposed in a physical computer, which differs from the virtual platform, and the management computer executes the coupling process and the allocation process by communicating with the virtual platform control part.

11. A computer system according to claim 1, wherein the prescribed data comprises program data of the application program, and application data used by the application program.

12. A computer system, which migrates an application program execution environment from a first computer to a second computer, wherein the second computer is configured as a virtual computer, which is disposed on a virtual platform for providing a virtual computer, the computer system comprising:

a storage control apparatus for storing prescribed data related to the application program; and a management computer, which is communicably coupled to the storage control apparatus, the first computer, and the second computer, and manages the storage control apparatus, the first computer, and the second computer, wherein the management computer executes:

a volume preparation process for preparing, in the storage control apparatus, a prescribed logical volume for storing the prescribed data so as to make it possible for the second computer to use the prescribed data related to the application program;

a coupling process for communicably coupling a communication interface part of the virtual platform to a communication port part, which is in the storage control apparatus and corresponds to the prescribed logical volume, so as to make it possible to access the prescribed logical volume prepared in the storage control apparatus via the virtual platform; and an allocation process for transparently allocating the prescribed logical volume to the second computer;

wherein the management computer executes a specification process prior to the volume preparation process, wherein, in the specification process, in a case where the application program execution environment of the first computer is to be migrated from the first computer to the second computer, information related to a logical volume used by the first computer is acquired from the first computer and presented to a user as migration-source volume candidate information, migration-destination volume information specified by the user is acquired, communication interface identification information for identifying the communication interface part, which is able to be used by the second computer, is acquired from the second computer, a determination is made as to whether there is a communication port part corresponding to the communication interface identification information by querying the storage control apparatus by showing the communication interface identification information, in a case where it has been determined that the communication port part corresponding to the communication interface identification information exists, a determination is made as to whether the migration-destination volume specified by the user is coupled to the communication port part, and is usable, and in a case where it has been determined that the migration-destination volume is coupled to the communication port part and is usable, information for identifying the prescribed logical volume selected by the user from among the migration-source volume candidate and information for identifying the migration-destination volume are associated with each other and transferred to the volume preparation process.

13. An application program execution environment migration method for migrating an application program execution environment from a first computer to a second computer, wherein the second computer is configured as a virtual computer, which is disposed on a virtual platform for providing a virtual computer, and a storage control apparatus for storing prescribed data related to the application program is provided, the application program execution environment migration method comprising the steps of:

a volume preparation process preparing, in the storage control apparatus, a prescribed logical volume for storing the prescribed data so as to make it possible for the second computer to use the prescribed data;

communicably coupling a communication interface part of the virtual platform to a communication port part, which is in the storage control apparatus and corresponds to the prescribed logical volume, so as to make it possible to access the prescribed logical volume prepared in the storage control apparatus via the virtual platform; and transparently allocating the prescribed logical volume to the second computer;

wherein a management computer executes a specification process prior to the volume preparation process, wherein, in the specification process, in a case where the application program execution environment of the first computer is to be copied to the second computer, information related to a logical volume used by the first computer is acquired from the first computer and presented to a user as copy-source volume candidate information, communication interface identification information for identifying the communication interface part capable of being used by the second computer is acquired from the second computer, a determination is made as to whether there is a communication port part corresponding to the communication interface identification information by querying the storage control apparatus by showing the communication interface identification information, in a case where it has been determined that the communication port part corresponding to the communication interface identification information exists, a list of logical volumes associated with the communication port part is acquired from the storage control apparatus, and presented to the user as copy-destination volume candidate information, a determination is made as to whether a copy-destination volume selected by the user from among the copy-destination candidate information is usable by querying the storage control apparatus by showing information for identifying the selected copy-destination volume, and in a case where it has been determined that the copy-destination volume is usable, information for identifying the prescribed logical volume selected by the user from among the copy-source volume information and information for identifying the copy-destination volume which has been determined to be usable are associated with each other and transferred to the volume preparation process.

* * * * *